US012670515B2

(12) United States Patent
Liao et al.

(10) Patent No.:     US 12,670,515 B2
(45) Date of Patent:     Jun. 30, 2026

(54) METHOD AND ELECTRONIC DEVICE FOR PROVIDING COMMODITY OBJECT SEARCH INFORMATION

(71) Applicant: Hangzhou Alibaba International Internet Industry Co., Ltd., Hangzhou (CN)

(72) Inventors: Kezheng Liao, Hangzhou (CN); Zhenfang Wu, Hangzhou (CN)

(73) Assignee: Hangzhou Alibaba International Internet Industry Co., Ltd., Hangzhou City (CN)

( * ) Notice: Subject to any disclaimer, the term of this patent is extended or adjusted under 35 U.S.C. 154(b) by 87 days.

(21) Appl. No.: 18/590,773

(22) Filed: Feb. 28, 2024

(65)          Prior Publication Data

US 2024/0403933 A1      Dec. 5, 2024

(30)          Foreign Application Priority Data

May 31, 2023     (CN) .......................... 202310639344.6

(51) Int. Cl.
 *G06F 16/00*          (2019.01)
 *G06Q 30/0601*        (2023.01)
(52) U.S. Cl.
 CPC ..... *G06Q 30/0627* (2013.01); *G06Q 30/0631* (2013.01); *G06Q 30/0643* (2013.01)
(58) Field of Classification Search
 CPC . G06F 16/00; G06Q 30/0627; G06Q 30/0601
 See application file for complete search history.

(56)          References Cited

U.S. PATENT DOCUMENTS

2012/0179716 A1*    7/2012   Takami ................... G06F 16/35
                                                        707/771
2016/0239892 A1*    8/2016   Kim ................... G06Q 30/0619
                             (Continued)

FOREIGN PATENT DOCUMENTS

CN          103793388 A      5/2014
CN          106326386 A      1/2017
                   (Continued)

OTHER PUBLICATIONS

Search Report for European Application No. 24160623.5, Dated Apr. 29, 2024, 8 pages.
                   (Continued)

*Primary Examiner* — Cheryl Lewis
(74) *Attorney, Agent, or Firm* — Lee & Hayes, P.C.

(57)          ABSTRACT

A method comprising determining a plurality of commodity objects meeting a search intent according to a commodity object search request submitted by a user; analyzing the plurality of commodity objects to obtain a plurality of commodity object combinations, and generating text content in units of commodity object combinations, wherein the text content is used for showing recommendation reason information corresponding to the commodity object combinations; and providing, to a client, the commodity object combinations and the corresponding text content to be displayed in a commodity search result page of the client. According to the present disclosure, information displayed on the commodity search result page can guide shopping, thus improving the browsing efficiency of users.

20 Claims, 12 Drawing Sheets

CLIENT
102

SERVER
104

(56)                References Cited

U.S. PATENT DOCUMENTS

| | | |
|---|---|---|
| 2018/0052842 A1 | 2/2018 | Hewavitharana et al. |
| 2020/0327895 A1 | 10/2020 | Gruber et al. |
| 2022/0394344 A1 * | 12/2022 | Xie .................... H04N 21/4788 |

FOREIGN PATENT DOCUMENTS

| | | | |
|---|---|---|---|
| CN | 107533545 | A | 1/2018 |
| CN | 112632246 | A | 4/2021 |
| CN | 112749322 | A | 5/2021 |
| CN | 113656026 | A | 11/2021 |
| CN | 114647801 | A | 6/2022 |
| CN | 114862516 | A | 8/2022 |

OTHER PUBLICATIONS

Machine translated Chinese Search Report for related Chinese patent application No. 202310639344.6, dated Dec. 18, 2025, 8 pates.
Machine translated First Chinese Office Action for related Chinese patent application No. 202310639344.6, dated Dec. 18, 2025, 9 pages.

* cited by examiner

Figure 2:
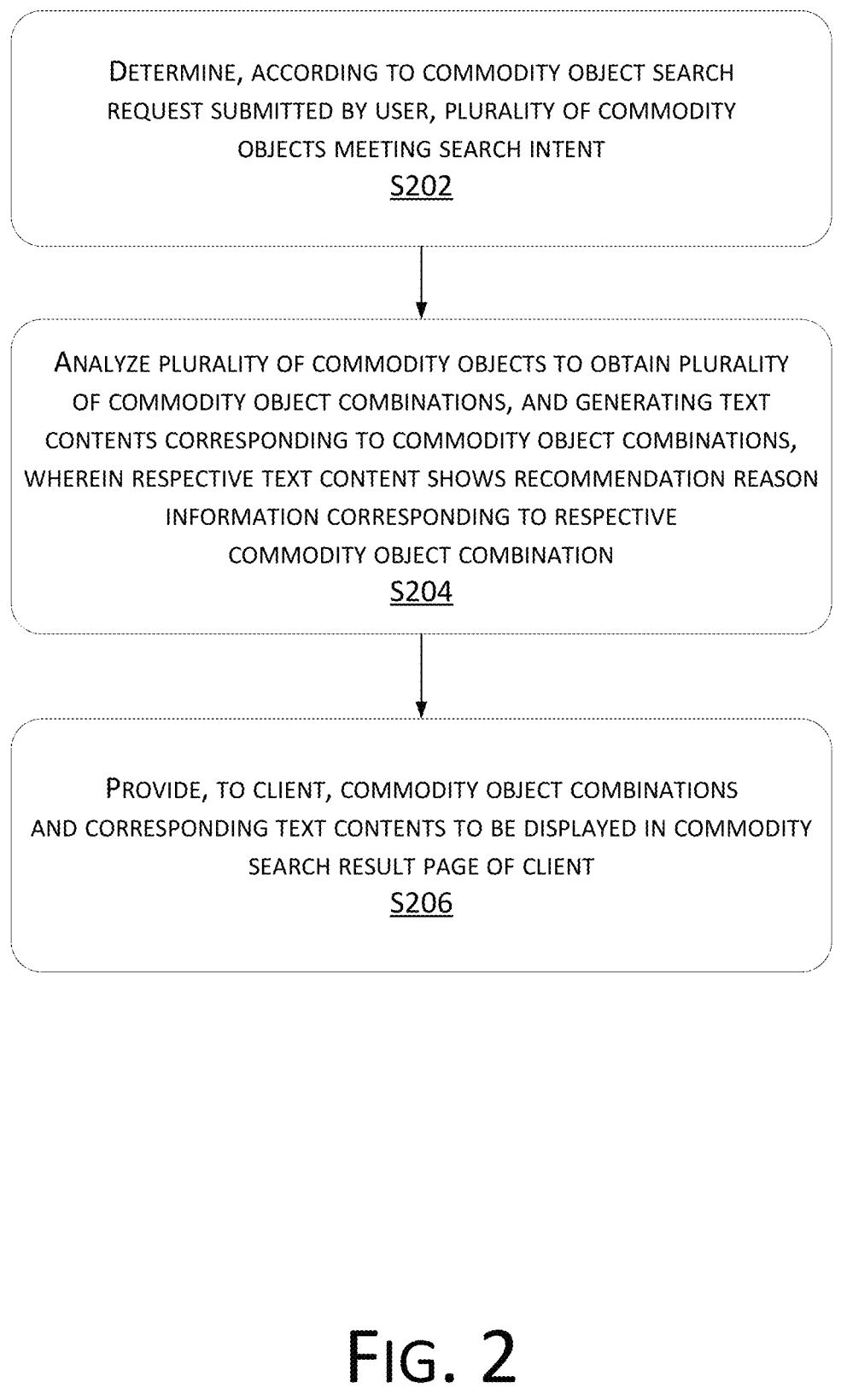

DETERMINE, ACCORDING TO COMMODITY OBJECT SEARCH REQUEST SUBMITTED BY USER, PLURALITY OF COMMODITY OBJECTS MEETING SEARCH INTENT
S202

ANALYZE PLURALITY OF COMMODITY OBJECTS TO OBTAIN PLURALITY OF COMMODITY OBJECT COMBINATIONS, AND GENERATING TEXT CONTENTS CORRESPONDING TO COMMODITY OBJECT COMBINATIONS, WHEREIN RESPECTIVE TEXT CONTENT SHOWS RECOMMENDATION REASON INFORMATION CORRESPONDING TO RESPECTIVE COMMODITY OBJECT COMBINATION
S204

PROVIDE, TO CLIENT, COMMODITY OBJECT COMBINATIONS AND CORRESPONDING TEXT CONTENTS TO BE DISPLAYED IN COMMODITY SEARCH RESULT PAGE OF CLIENT
S206

HI, IT'S MY GIRLFRIEND'S BIRTHDAY NEXT WEEK AND I WANT TO BUY HER A GIFT.

OKAY, LET ME RECOMMEND SOME GIFTS FOR YOU.

SEARCH

★ RESULTS

A CERTAIN BRAND
THIS IS A CANADIAN BRAND THAT SPECIALIZES IN PROVIDING FASHIONABLE AND HIGH-QUALITY CLOTHING FOR WOMEN, KNOWN FOR ITS MINIMALISM.

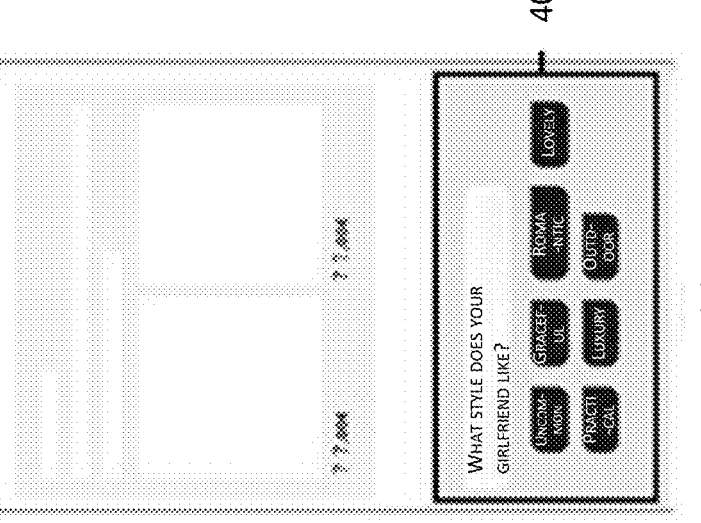

A CERTAIN BRAND
A SHOE BRAND THAT FOCUSES ON ECO-FRIENDLY COMFORT, MAINLY MADE OF NATURAL MATERIALS SUCH AS WOOL, PLANTS, ETC.

(B) — 404

WHAT STYLE DOES YOUR GIRLFRIEND LIKE?

[style option buttons: OTHER CLASS, OFFICE LADY, LOVELY, ...]

(C) — 406

12:34

HI, IT'S MY GIRLFRIEND'S BIRTHDAY NEXT WEEK AND I WANT TO BUY HER A GIFT.

OKAY, LET ME RECOMMEND SOME GIFTS FOR YOU.

I'D LIKE TO SEE OPTIONS FOR UNCOMMON STYLE

OKAY! THE BEST UNCOMMON BRAND FOR YOUR FRIEND'S BIRTHDAY GIFT DEPENDS ON YOUR FRIEND'S PERSONAL STYLE AND PREFERENCES. HERE ARE SOME SUGGESTIONS.

SEARCH

★ RESULTS

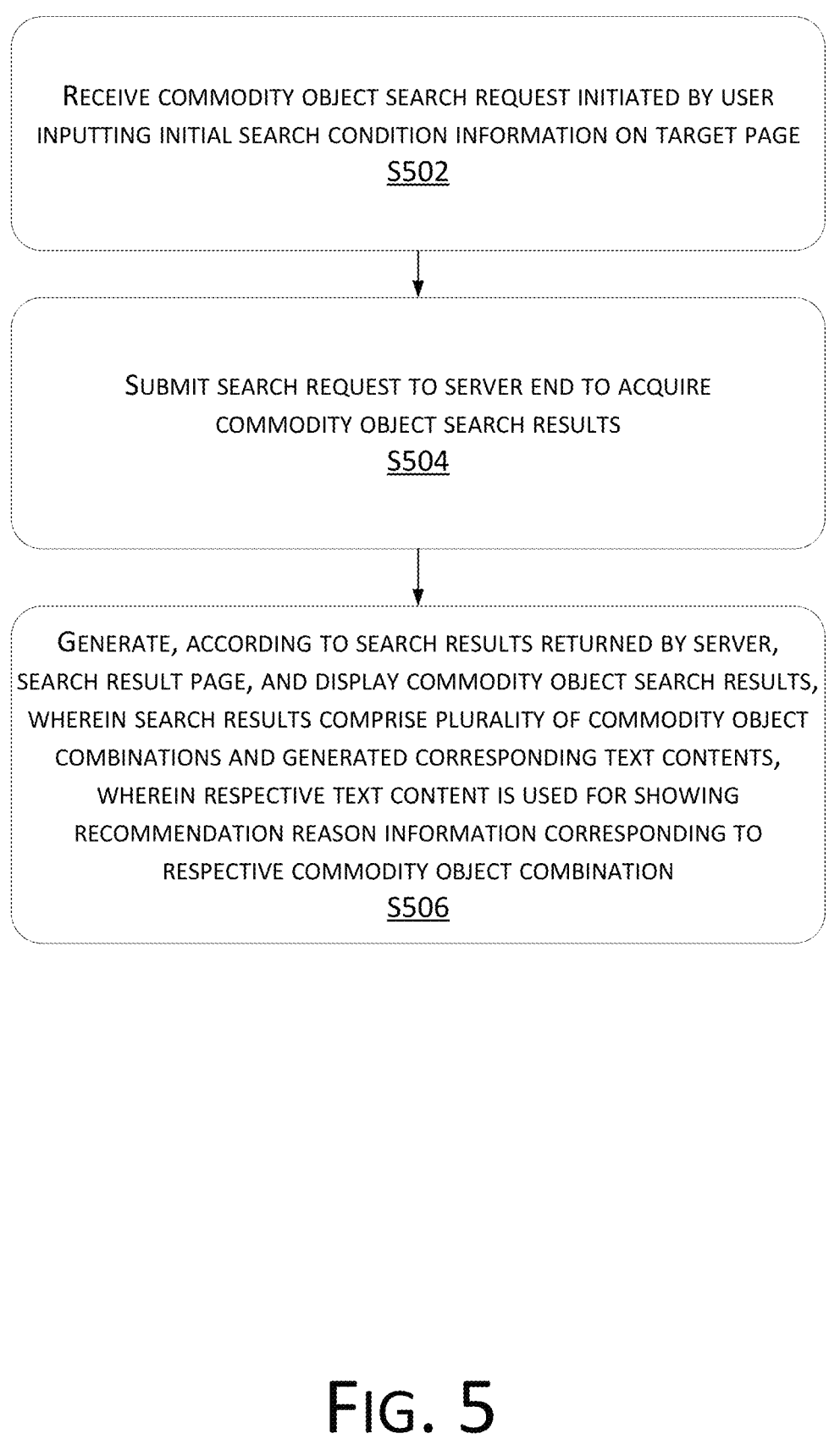

RECEIVE COMMODITY OBJECT SEARCH REQUEST INITIATED BY USER
INPUTTING INITIAL SEARCH CONDITION INFORMATION ON TARGET PAGE
S502

SUBMIT SEARCH REQUEST TO SERVER END TO ACQUIRE
COMMODITY OBJECT SEARCH RESULTS
S504

GENERATE, ACCORDING TO SEARCH RESULTS RETURNED BY SERVER,
SEARCH RESULT PAGE, AND DISPLAY COMMODITY OBJECT SEARCH RESULTS,
WHEREIN SEARCH RESULTS COMPRISE PLURALITY OF COMMODITY OBJECT
COMBINATIONS AND GENERATED CORRESPONDING TEXT CONTENTS,
WHEREIN RESPECTIVE TEXT CONTENT IS USED FOR SHOWING
RECOMMENDATION REASON INFORMATION CORRESPONDING TO
RESPECTIVE COMMODITY OBJECT COMBINATION
S506

FIG. 5

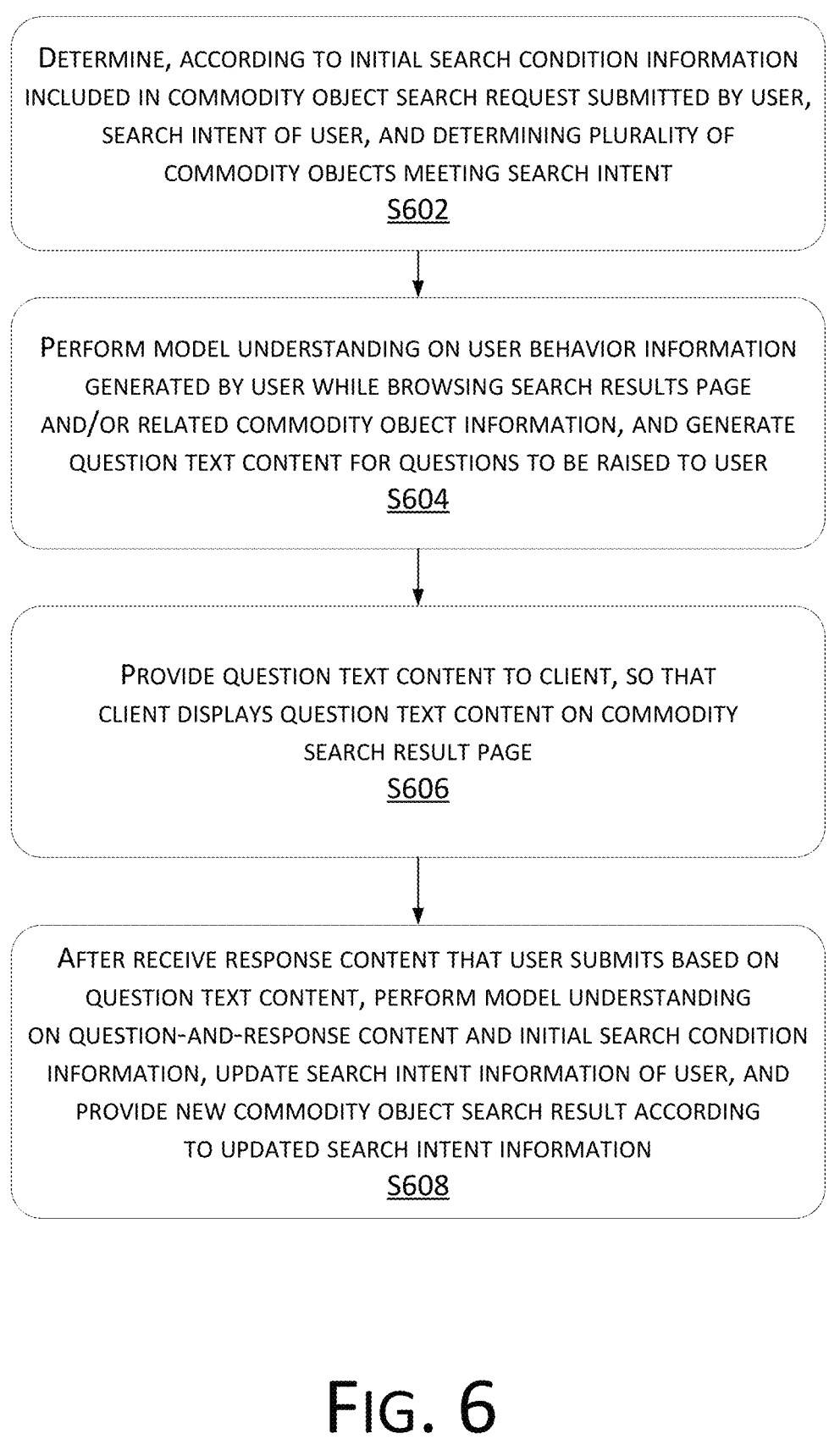

DETERMINE, ACCORDING TO INITIAL SEARCH CONDITION INFORMATION INCLUDED IN COMMODITY OBJECT SEARCH REQUEST SUBMITTED BY USER, SEARCH INTENT OF USER, AND DETERMINING PLURALITY OF COMMODITY OBJECTS MEETING SEARCH INTENT
S602

PERFORM MODEL UNDERSTANDING ON USER BEHAVIOR INFORMATION GENERATED BY USER WHILE BROWSING SEARCH RESULTS PAGE AND/OR RELATED COMMODITY OBJECT INFORMATION, AND GENERATE QUESTION TEXT CONTENT FOR QUESTIONS TO BE RAISED TO USER
S604

PROVIDE QUESTION TEXT CONTENT TO CLIENT, SO THAT CLIENT DISPLAYS QUESTION TEXT CONTENT ON COMMODITY SEARCH RESULT PAGE
S606

AFTER RECEIVE RESPONSE CONTENT THAT USER SUBMITS BASED ON QUESTION TEXT CONTENT, PERFORM MODEL UNDERSTANDING ON QUESTION-AND-RESPONSE CONTENT AND INITIAL SEARCH CONDITION INFORMATION, UPDATE SEARCH INTENT INFORMATION OF USER, AND PROVIDE NEW COMMODITY OBJECT SEARCH RESULT ACCORDING TO UPDATED SEARCH INTENT INFORMATION
S608

FIG. 6

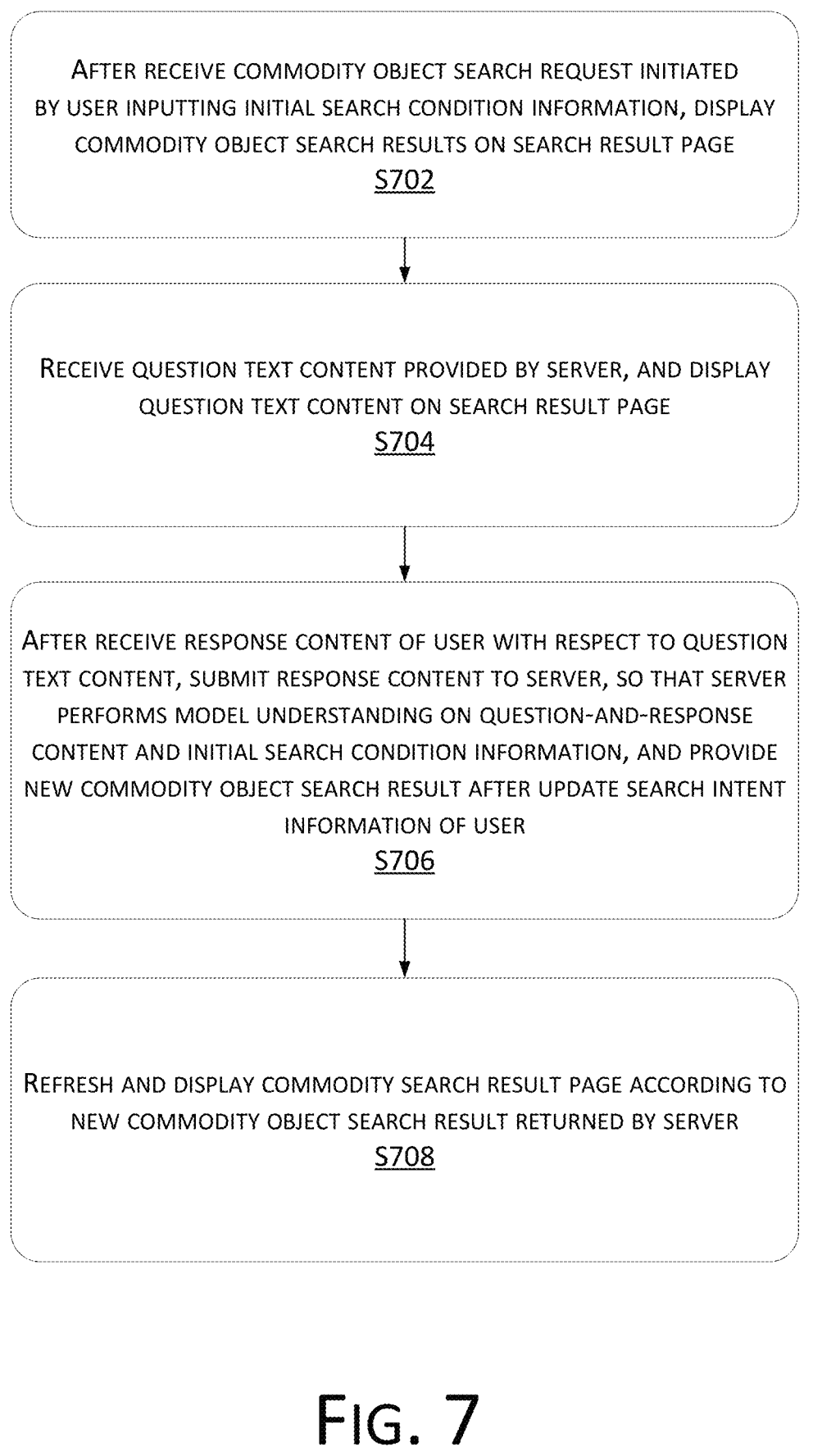

AFTER RECEIVE COMMODITY OBJECT SEARCH REQUEST INITIATED BY USER INPUTTING INITIAL SEARCH CONDITION INFORMATION, DISPLAY COMMODITY OBJECT SEARCH RESULTS ON SEARCH RESULT PAGE
S702

RECEIVE QUESTION TEXT CONTENT PROVIDED BY SERVER, AND DISPLAY QUESTION TEXT CONTENT ON SEARCH RESULT PAGE
S704

AFTER RECEIVE RESPONSE CONTENT OF USER WITH RESPECT TO QUESTION TEXT CONTENT, SUBMIT RESPONSE CONTENT TO SERVER, SO THAT SERVER PERFORMS MODEL UNDERSTANDING ON QUESTION-AND-RESPONSE CONTENT AND INITIAL SEARCH CONDITION INFORMATION, AND PROVIDE NEW COMMODITY OBJECT SEARCH RESULT AFTER UPDATE SEARCH INTENT INFORMATION OF USER
S706

REFRESH AND DISPLAY COMMODITY SEARCH RESULT PAGE ACCORDING TO NEW COMMODITY OBJECT SEARCH RESULT RETURNED BY SERVER
S708

FIG. 7

METHOD AND ELECTRONIC DEVICE FOR PROVIDING COMMODITY OBJECT SEARCH INFORMATION

CROSS REFERENCE TO RELATED APPLICATIONS

This application claims priority to and is a continuation of Chinese patent application No. 202310639344.6 filed on 31 May 2023 and entitled "METHOD AND ELECTRONIC DEVICE FOR PROVIDING COMMODITY OBJECT SEARCH INFORMATION," which is incorporated herein by reference in its entirety.

TECHNICAL FIELD

The present disclosure relates to the technical field of commodity search, and, more particularly, to method and electronic devices for providing commodity object search information.

BACKGROUND

In the commodity information service system, users are provided with the commodity search service. The traditional search manner is to provide a search entry on pages like the home page of a client. Users may input search keywords through the search entry; and then, the system returns search results matching the keywords. The users may review commodities meeting their needs from the search result. Alternatively, in another manner, some commodity information service systems may also perform a commodity search function based on images. That is, users may input a photo and the like containing a desired commodity image through the search entry. Accordingly, the system may return information of commodities that belong to the same or having similar style as the commodity contained in the photo for browsing and selection by the users.

All of the above manners can help users to find their desired commodities. However, on the traditional commodity search result page, multiple commodity information cards are usually arranged and displayed in the form of information flow. Whether users will click on a certain commodity information card depends entirely on if they are interested in the displayed images, titles, etc. of the information cards, resulting in a very low browsing efficiency.

SUMMARY

The present disclosure provides a method for providing commodity object search information and an electronic device, which enables information displayed on a commodity search result page to guide shopping, thus improving the browsing efficiency of users.

The present disclosure provides the following solutions:

A method for providing commodity object search information, comprising:

determining, according to a commodity object search request submitted by a user, a plurality of commodity objects meeting a search intent;

analyzing the plurality of commodity objects to obtain a plurality of commodity object combinations, and generating text contents in units of the commodity object combinations, wherein the respective text content shows recommendation reason information corresponding to the respective commodity object combination; and providing, to a client, the commodity object combinations and the corresponding text content to be displayed in a commodity search result page of the client.

The commodity object search request comprises initial search condition information input by the user, and the initial search condition information comprises a long statement expressed in natural language;

the determining, according to the commodity object search request submitted by the user, the plurality of commodity objects meeting the search intent comprises:

performing model understanding on the long statement expressed in natural language by using artificial intelligence (AI) large-scale parametric model, so as to acquire search intent information of the user; and determining the plurality of commodity objects meeting the search intent based on the search intent information.

The method further comprises:

before receiving the commodity object search request, generating prompt text content for guiding a search initiated by means of inputting the long statement expressed in natural language; and providing the prompt text content to the client, so that the client displays the prompt text content in an interface used for receiving a search input condition.

The method further comprises:

providing, to the client, a recommended topic text, so as to allow the client to display the recommended topic text in the form of tags; and after receiving a selection operation on the tag performed by the use, initiating a search request by using the corresponding topic text as a search condition.

The method further comprises:

using the AI large-scale parametric model to perform model understanding on user behavior information generated by the user while browsing the search results page and/or related commodity object information, and generating question text content for questions to be raised to the user;

providing the question text content to the client, so that the client displays the question text content on the commodity search result page; and after receiving response content that the user submits based on the question text content, performing model understanding on question-and-response content and the initial search condition information through the AI large-scale parametric model, updating the search intent information of the user, and providing a new commodity object search result according to the updated search intent information.

The method further comprises:

when generating the question text content for questions to be raised to the user, further generating a plurality of alternative response text content, and providing the alternative response text content to the client, so as to allow the user to respond by making a selection from the plurality of alternative response text content.

Herein, a process of generating dialogue text content and receiving response content that the user submits has multiple rounds, so that the AI large-scale parametric model gradually acquires and updates the search intent information of the user by performing model understanding on the dialogue content accumulated in the multiple rounds of question-and-response process and the initial search condition information.

A method for providing commodity object search information, comprising:

receiving a commodity object search request initiated by a user inputting initial search condition information on a target page;

submitting the search request to a server to acquire commodity object search results; and generating, according to the search results returned by the server, a search result page, and displaying the same, wherein the search results comprise a plurality of commodity object combinations and the generated text content, wherein the text content is used for showing recommendation reason information corresponding to the commodity object combinations.

The initial search condition information comprises a long statement expressed in natural language;

the method further comprises:

providing prompt text content for guiding a search initiated by means of inputting the long statement expressed in natural language on the target page, so that the server acquires search intent information of the user by using an AI large-scale parametric model to performing model understanding on the long statement expressed in natural language; and determining a plurality of commodity objects meeting a search intent based on the search intent information.

The method further comprises:

receiving question text content provided by the server, and displaying the question text content on the search result page, wherein the question text content comprises: text content used for questions to be raised to the user and generated after the AI large-scale parametric model performs model understanding on user behavior information generated by the user when browsing the search result page and/or related commodity object information;

after receiving response content from the user with respect to the question text content, submitting the response content to the server, so that the server performs model understanding on question-and-response content and the initial search condition information using the AI large-scale parametric model, and providing a new commodity object search result after updating search intent information of the user; and according to a new commodity object search result returned by the server, refreshing and displaying the commodity search result page.

Herein, a process of generating dialogue text content and receiving response content that the user submits has multiple rounds, so that model understanding is performed on the dialogue content accumulated in the multiple rounds of question-and-response process and the initial search condition information, and the search intent information of the user is gradually acquired and updated.

The method further comprises:

providing a dialogue content display area in the search result page, wherein the dialogue content display area, by default, is configured to display the latest round of dialogue content; and after receiving a request for backtracking historical dialogue content, displaying the historical dialogue content in the dialogue content display area.

A method for providing commodity object search information, comprising:

determining, according to initial search condition information included in a commodity object search request submitted by a user, a search intent of the user, and determining a plurality of commodity objects meeting the search intent;

performing model understanding on user behavior information generated by the user while browsing a search results page and/or related commodity object information, and generating question text content for questions to be raised to the user;

providing the question text content to a client, so that the client displays the question text content on the commodity search result page; and after receiving response content that the user submits based on the question text content, performing model understanding on question-and-response content and the initial search condition information, updating the search intent information of the user, and providing a new commodity object search result according to the updated search intent information.

A method for providing commodity object search information, comprising:

after receiving a commodity object search request initiated by a user inputting initial search condition information, displaying commodity object search results on a search result page;

receiving question text content provided by a server, and displaying the question text content using the search result page, wherein the question text content is text content used for questions to be raised to the user and generated after model understanding is performed on user behavior information generated by the user when browsing the search result page and/or related commodity object information;

after receiving response content of the user with respect to the question text content, submitting the response content to the server, so that the server performs model understanding on question-and-response content and the initial search condition information, and providing a new commodity object search result after updating search intent information of the user; and according to a new commodity object search result returned by the server, refreshing and displaying the commodity search result page.

Herein, the question text content is generated by calling an AI large-scale parametric model, and the question-and-response content is question-and-response content generated during a single round or multiple rounds of question-and-response dialogue interaction between the AI large-scale parametric model and the user.

Herein, the after receiving response content of the user with respect to the question text content, submitting the response content to the server comprises:

receiving the response content through a search input control on the search result page, and submitting the same to the server.

Herein, the after receiving response content of the user with respect to the question text content, submitting the response content to the server comprises:

receiving the response content through a dialogue interaction entry component displayed on hover of the search result page, and submitting the same to the server.

An apparatus for providing commodity object search information, comprising:

a search result determination unit, configured to determine, according to a commodity object search request submitted by a user, a plurality of commodity objects meeting a search intent;

a search result organization and content generation unit, configured to analyze the plurality of commodity objects to obtain a plurality of commodity object combinations, and generate text content in units of the commodity object combinations, wherein the text content shows recommendation reason information corresponding to the commodity object combinations; and a search result and content providing unit, configured to provide, to a client, the commodity object combinations and the corresponding text content to be displayed in a commodity search result page of the client.

An apparatus for providing commodity object search information, comprising:

a request receiving unit, configured to receive a commodity object search request initiated by a user inputting initial search condition information on a target page;

a request submission unit, configured to submit the search request to a server to acquire commodity object search results; and a search result page display unit, configured to generate, according to the search results returned by the server, a search result page, and display the same, wherein the search results comprise a plurality of commodity object combinations and the generated text content, wherein the text content is used for showing recommendation reason information corresponding to the commodity object combinations.

An apparatus for providing commodity object search information, comprising:

a search result determination unit, configured to determine, according to initial search condition information included in a commodity object search request submitted by a user, a search intent of the user, and determine a plurality of commodity objects meeting the search intent;

a question text content generation unit, configured to perform model understanding on user behavior information generated by the user while browsing a search results page and/or related commodity object information, and generate question text content for questions to be raised to the user;

a question text content providing unit, configured to provide the question text content to a client, so that the client displays the question text content on the commodity search result page; and a search result update unit, configured to: after response content that the user submits based on the question text content is received, perform model understanding on question-and-response content and the initial search condition information, update the search intent information of the user, and provide a new commodity object search result according to the updated search intent information.

An apparatus for providing commodity object search information, comprising:

a search result display unit, configured to: after a commodity object search request initiated by a user inputting initial search condition information is received, display commodity object search results on a search result page;

a question text content display unit, configured to receive question text content provided by a server, and display the question text content using the search result page, wherein the question text content is text content used for questions to be raised to the user and generated after model understanding is performed on user behavior information generated by the user when browsing the search result page and/or related commodity object information;

a response content submission unit, configured to: after response content of the user with respect to the question text content is received, submit the response content to the server, so that the server performs model understanding on question-and-response content and the initial search condition information, and provides a new commodity object search result after updating search intent information of the user; and a search result refresh and display unit, configured to, according to a new commodity object search result returned by the server, refresh and display the commodity search result page.

A computer-readable storage medium, having stored thereon a computer program which, when executed by a processor, implements the steps described in any of the above-described methods.

An electronic device, comprising:

one or more processors; and a memory associated with the one or more processors, the memory being configured to store program instructions which, when read and executed by the one or more processors, execute the steps described in any of the above-described methods.

According to specific examples provided by the present disclosure, the present disclosure discloses the following technical effects:

in the examples of the present disclosure, after a commodity object search request submitted by a user is received and a plurality of commodity objects meeting a search intent are determined, a plurality of commodity object combinations can be obtained by analyzing the plurality of commodity objects, and text content in units of the commodity object combinations can be generated, so that the recommendation reason information corresponding to the specific commodity object combinations can be shown through the text content. In this way, the client can display the above commodity object combinations and the corresponding text content on the search result page. In this way, when the commodity object search results are displayed, various commodity objects can be displayed in groups instead of simply being individually listed, where each group may further correspond to the text content of the respective reasons for recommendation. In this way, the amount of text displayed on the commodity search result page is increased compared to the traditional method. However, since more thorough content is shown, the presence of such content allows the information displayed on the commodity search result page to guide shopping. Thus, comprehension burden of users understanding commodity information can be reduced. Users may determine whether to click and view a specific commodity by referring to shopping-guided text content, thus more user friendly and more conducive to improving indexes such as the click-through rate of the commodities.

For example, in the process of displaying the search result page, capabilities such as natural language understanding and generating of the AI large-scale parametric model can be fully leveraged to perform further model understanding on user behavior data and/or related commodity information, so as to generate text content for questions further to be raised to the users. In this way, users can be guided to respond to the text content. Accordingly, the AI large-scale parametric model can acquire more detailed information about the search intent of the users by performing model understanding on question-and-response content and the previous initial search condition information, and provide a new commodity object search result based on the updated user needs information.

In addition, the AI large-scale parametric model further has the capability to perform multiple rounds of dialogue, and as such, this dialogue process may also be carried out multiple times. In other words, after the commodity search result is updated, the process may continue with more questions raised according to the user behavior data, so that the AI large-scale parametric model may gradually acquire more detailed and precise information about the search intent of the users in the process of carrying out multiple rounds of dialogue therewith, and thus providing search results better matching the needs of the users. In this way, the whole process of "shop-along" search can be carried out for the users using the AI large-scale parametric model, so as to help the users to find commodities they really desired. In addition, although such "shop-along" search can be carried out through the whole process, the function does not have to be there the whole time, nor are users always asked to take part in the dialogue. Instead, according to the real-time behavior data users generate on the search result page, an appropriate dialogue timing is chosen for carrying out the dialogue with the users. In this way, interference to users who are accustomed to the traditional search method can also be reduced, and at the same time, the quality of the search results is improved.

Of course, implementation of any products of the present disclosure does not necessarily need to simultaneously achieve all of the advantages described above.

BRIEF DESCRIPTION OF DRAWINGS

To describe the technical solutions in the examples of the present disclosure more clearly, the following briefly describes the accompanying drawings required for describing the examples. Apparently, the accompanying drawings in the following description are merely some examples of the present disclosure, and those ordinary skill in the art may further derive other accompanying drawings from these accompanying drawings without inventive efforts.

FIG. 2 is a flowchart of a first method provided by an example of the present disclosure;

FIG. 4 is a schematic diagram of multiple rounds of dialogue interaction provided by an example of the present disclosure;

FIG. 5 is a flowchart of a second method provided by an example of the present disclosure;

FIG. 6 is a flowchart of a third method provided by an example of the present disclosure;

FIG. 7 is a flowchart of a fourth method provided by an example of the present disclosure;

DETAILED DESCRIPTION

Figure 1:
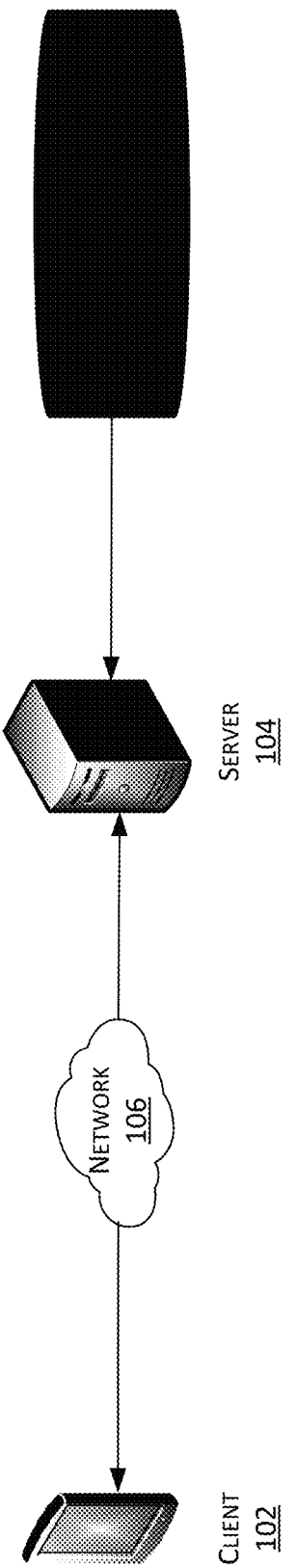
FIG. 1 is a schematic diagram of a system architecture provided by an example of the present disclosure.

The technical solutions in the examples of the present disclosure will be clearly and completely described below with reference to the accompanying drawings in the examples of the present disclosure. Apparently, the described examples are merely some, but not all, of the examples of the present disclosure. Based on the examples in the present disclosure, all other examples obtained by those of ordinary skill in the art shall fall within the protection scope of the present disclosure.

In the examples of the present disclosure, in order to better meet the various needs of users in the process of searching for commodity objects, the capabilities of AI (Artificial Intelligence) large models can be applied to the scenario of commodity object search. Here, the so-called AI large-scale parametric model refers to a model that is pre-trained using neural network models on a large-scale dataset containing a huge amount of data. Such a model has a huge amount of model parameters, and generally has a powerful model understanding capability on text information, image information, and the like. In addition, such model also has a content generation capability. For example, the generated content may include text, images, videos, voice, and the like. Because of its powerful model understanding capability, such AI large-scale parametric model has been used in many fields. The AI large-scale parametric model seen in the examples of the present disclosure is used in the field of commodity object search.

It should be noted that in the process of using the AI large-scale parametric model in the field of commodity search, the specific interactions the model has with users is also a very important part. In some existing commodity information service systems, attempts related to the use of the AI large-scale parametric model have been made, but most of the time the "AI robot" mode is used to provide dialogue services to the users. This means that users can search for a dialogue entry with the AI robot on a client interface of the commodity information service system, and then the system can display the dialogue interface with the AI robot for the users. In the dialogue interface, the users may describe the commodities they are looking for, and the AI robot can, by carrying out a dialogue with the users, understand the users' needs in further details, and recommended commodities may also be provided in the dialogue interface. Here, the information input by the users and the display of commodity recommendation results are both presented in the form of chat "bubbles", which limits the amount and preciseness of the recommended commodity results, making it difficult to meet users' needs. In addition, since users need to initiate the act of entering the interface for carrying out a dialogue with the "AI robot" to obtain relevant functions, users who are accustomed to using functions like "home page search" may not be used to this function, and users may even ignore the existence of such function.

Based on the above, in the examples of the present disclosure, the use of the AI large-scale parametric model in the commodity object search scenario is innovated. For example, on the basis of the traditional home page search function and the like of the client, the examples of the present disclosure can directly incorporate the functions related to the understanding of the search intent of the users based on the AI large-scale parametric model, so that after users enter from the traditional commodity search entry of the commodity information service system, they may initiate a commodity search request by inputting long statements described in natural language as the search conditions. If users still initiate the search request by inputting a keyword, such a method is certainly also supported. Afterwards, the capability of the AI large-scale parametric model can be used to perform natural language understanding on the search condition input by the user, so as to analyze the search intent of the users, and provide the commodity object search result.

In the process of providing the commodity search result page, the capability of the AI large-scale parametric model can be continuously used to provide users with more thorough information. For example, on the traditional commodity search result page, a plurality of commodity information cards are usually listed and displayed in the form of information flow. However, a problem with information presented in this manner is that the users may not understand the reasons for displaying the commodities. That is, the presentation of the specific search results lacks organization, and the information presented on the page cannot guide shopping, as such whether users will click on a certain commodity information card depends entirely on users' own interest. However, in the examples of the present disclosure, after a plurality of commodity objects meeting search needs are determined, the AI large-scale parametric model may further be used to group the plurality of commodity objects included in the search results by different dimensions such as brand, category, function, applicable population, applicable occasions and so on, and generate corresponding text content in units of commodity object combinations. The text content can be used to express, for example, recommendation reasons for a specific commodity object combination. In this way, when the commodity object search results are displayed, various commodity objects can be displayed in groups instead of simply being individually listed, where each group may further correspond to the text content of the respective reasons for recommendation. In this way, the amount of text displayed on the commodity search result page is increased compared to the traditional method. However, since more thorough content is shown, the presence of such content allows the information displayed on the commodity search result page to guide shopping. Personalized text content may also be generated for different scenarios. Thus, comprehension burden of users understanding commodity information can be reduced. Users may determine whether to click and view a specific commodity by referring to shopping-guided text content, thus more user friendly and more conducive to improving indexes such as the click-through rate of the commodities.

In addition, it should be noted that in the examples of the present disclosure, users are supported to express their needs inexplicitly by means of long statements in natural language, thus commodity searches in some complex scenarios can be better supported. For example, in a gift-giving scenario, users may not know exactly what kind of gift is more ideal. In this case, the need to give a gift may be directly used as a search condition to initiate a search. Accordingly, the search results may include a variety of different categories and brands and other more diversified commodity information. In this case, the method provided by the examples of the present disclosure, grouping commodity search results and providing corresponding recommendation reason information, will be more applicable, thus avoiding problems such as the search results being too confusing and posing greater difficulties for users to filter and select.

In addition to improving the presentation of the commodity search results, in the example of the present disclosure, in the process of displaying the search result page, capabilities such as natural language understanding and generating of the AI large-scale parametric model can be fully leveraged to perform further model understanding on user behavior data and/or related commodity information, so as to generate text content for questions further to be raised to the users. The text content may be inserted into the commodity search result page for display, or may be displayed in a pop-up window on the commodity search result page, and the like. For example, if it is found that a user has continuously swiped through multiple times on the current search result page without performing any click action, analysis may be conducted based on commodity information that has been displayed, and text content for questions to be raised is generated, and the like. As such, users may be guided to respond to the text content. Accordingly, the AI large-scale parametric model can acquire more detailed information about the search intent of the users by performing model understanding on question-and-response content and the previous initial search condition information, and provide a new commodity object search result based on the updated user needs information. In addition, the AI large-scale parametric model further has the capability to perform multiple rounds of dialogue, and as such, this dialogue process may also be carried out multiple times. In other words, after the commodity search result is updated, the process may continue with more questions raised according to the user behavior data, so that the AI large-scale parametric model may gradually acquire more detailed and precise information about the search intent of the users in the process of carrying out multiple rounds of dialogue therewith, and thus providing search results better matching the needs of the users.

It should be noted that in the foregoing manner, since some dialogue content can be generated using the AI large-scale parametric model in the process of displaying commodity search results, more information about the search intent of the user can be continuously acquired through multiple rounds of dialogue. The previous identification results may even be corrected and the commodity search results can be refreshed. Therefore, the AI large-scale parametric model can be used to carry out a whole process of "shop-along" search for the user, so as to help the users to find a commodity they really desire. In addition, although such "shop-along" search can be carried out through the whole process, the function does not have to be there the whole time, nor are users always asked to take part in the dialogue. Instead, according to the real-time behavior data users generate on the search result page, an appropriate dialogue timing is chosen for carrying out the dialogue with the users. For example, if it is found that a user has continuously swiped through multiple times on the search result page without any click operation, or has clicked on a certain commodity without performing a further operation and has returned to the search result page, a dialogue with the user may be carried out at moments like these. As such, compared with having a direct dialogue in a chat interface with an "AI robot", the weight of the "dialogue" is reduced, and users are led to feel that they are still conducting a search for commodities, and the "dialogue" is merely assisting, not overshadowing. In this way, interference to users who are accustomed to the traditional search method can also be reduced, and at the same time, the quality of the search results is improved.

From the perspective of a system architecture, the examples of the present disclosure can provide users with intelligent search services using the AI large-scale parametric models and other capabilities in a commodity information service system. Referring to FIG. 1, the system may include a client 102 and a server 104. The client 102 may be present in the form of an application (App) or a page such as Web or H5, etc., which mainly runs on a terminal device of a user, including mobile devices such as a mobile phone. The server 104 may run on a remote server, which, for example, may be a cloud server or an independent server, etc. The client 102 is mainly configured to display front-end pages and interact with the users, including displaying a search initiation page, receiving search conditions input by the users, and submitting the same, receiving search results returned by the server and displaying the same, etc. The server 104 is mainly configured to provide specific search services. The client 102 and the server 104 communicates via a network 106. The examples of the present disclosure further involve calling the AI large-scale parametric model 108 to acquire the search intent of the users, generate relevant dialogue text content, and the like.

The specific implementation solutions provided by the examples of the present disclosure are described in detail below.

The present disclosure provides a method for providing commodity object search information from the perspective of a server. Referring to FIG. 2, the method may comprise:

S202: determining, according to a commodity object search request submitted by a user, a plurality of commodity objects meeting a search intent.

In the example of the present disclosure, the capability of an AI large-scale parametric model can be brought into the traditional commodity search process. That is, in the regular process of searching commodity objects of a user, assistance may be provided using the capability of the AI large-scale parametric model, or the support for more convenient search manners may be provided.

For example, since the same search entry (that is, an input control for inputting search conditions) can be directly shared with the traditional keyword search method, in order to enable users to be aware of the existence of the AI large-scale parametric model, some guiding information may also be provided on the page related to displaying the search entry, so as to help users to adapt to the process by gradually transitioning from being accustomed to inputting keywords for searches to inputting relatively complex long statements, and then to inputting even more complex long statements. That is to say, before receiving a specific commodity object search request, prompt text content for guiding a search initiated by means of inputting a long statement expressed in natural language may also be generated, and such prompt text content can be provided to the client, so that the client displays the prompt text content in an interface used for receiving a search input condition. In a specific implementation, such guiding information may further include images related to "AI", and the like.

Figure 3:
FIG. 3 is a schematic diagram of an interface provided by an example of the present disclosure.

For example, as shown in FIG. 3(A), assuming what is shown is a client home page of a commodity information service system, a search entry is provided at the top of the page. In the traditional manner, a search entry will also be provided at the same position of the page. However, in the example of the present disclosure, the search capability based on the AI large-scale parametric model can be directly provided via this entry. Therefore, in order to raise users' awareness of this capability further, as shown at 302 in FIG. 3(A), "Ask me some questions and I can find out what you need in a smarter way" may be provided above the input control. For example, prompt content related to the "AI" image may also be provided, such as the "AI" avatar displayed in the upper left corner of position 302 in FIG. 3(A).

In addition, after the search entry is clicked and a page used for submitting a search request is shown, information such as self-introduction about "AI" may further be displayed. For example, as shown at 304 in FIG. 3(B), "Hi, I'm **\*\*, I'm your shopping assistant. Tell me what you are thinking of getting?" is displayed above the search input box, which guides users to initiate a search request by inputting more complex long statement expressed in natural language. In addition, in order for users not to think that they can only search by inputting keywords, some recommended topics and the like may also be provided. Certainly, these recommended topics may also be generated after predicting a possible search intent of the users, thus guiding the users to initiate a search by inputting a long statement. For example, as shown at 304 in FIG. 3**(B), specific topics may include "#Women fashion", "#Home life", "#Gifts", and so on. For example, the above recommended topics may also be displayed in a tagged manner. If the tags include statements matching the search intent of the users, the users may initiate a search by directly clicking on the tags. In this way, traditional search history, search suggestions, ranking list recommendations and other capabilities may be displayed through dialogue topics and tags, and users may be guided to input search conditions.

Certainly, in the example of the present disclosure, when initiating a search request, a user may input keywords like a traditional search, or the user may also input long statements expressed in natural language to initiate a commodity search request. For example, if a user wants to buy a gift for a friend, the user may need to think of several commodity category candidates when using the traditional search method, and then initiate a search by using specific category titles as keywords, such as perfumes, flowers, etc. However, in the example of the present disclosure, the user may directly input, in the commodity search box, "Pick a gift for a female friend, the gift should be of high quality and is priced at about 500 RMB", and the like. For the latter, the user may complete the input through text or speech. After that, the AI large-scale parametric model can be used to perform model understanding on the long statement expressed in natural language, so as to acquire search intent information of the user; a plurality of commodity objects meeting the search intent are determined based on the search intent information. The AI large-scale parametric model supports the input of complex language and the identification of intent and thus performs better in identifying unclear intent when compared with the traditional keyword method, thus making speech input more practical. For example, after understanding the long statement in the above example, it can be determined that the search intent of the user is to find commodities suitable as gifts for female friends. The specific commodity search results returned may thus include perfume, flowers, and other categories of commodities. That is to say, in this case of performing commodity search based on the capability of the AI large-scale parametric model, although users may not clearly indicate which commodity category is needed, the AI large-scale parametric model may perform understanding on the intent of the users, and assist the users by selecting and recommending suitable commodity categories.

After the search intent of the users is obtained through the AI large-scale parametric model, the commodity search results may be generated in various manners. For example, in one way, information such as matching commodity categories, price ranges, and the like may be generated after the AI large-scale parametric model performs understanding on the search intent of the users, and then the commodity search results meeting the search intent may be determined by means of the traditional commodity tag matching, and the like. Alternatively, in another manner, the capability of the AI large-scale parametric model may still be leveraged in the process to transform the multi-modal information of the commodity (including text such as commodity titles, commodity pictures, videos, user reviews, etc.) into the model's understanding of the commodity, and thus which commodities match the current search intent of the users may then be determined on such basis. In other words, in this manner, the multi-modal information of commodities is directly input into the AI large-scale parametric model rather than relying on processes such as adding various tags to the commodities in advance. The AI large-scale parametric model may then understand occasions, populations, and the like for which a specific commodity is suitable, and whether commodities meet the current search intent of the user, and the like.

S204: analyzing the plurality of commodity objects to obtain a plurality of commodity object combinations, and generating text contents corresponding to the commodity object combinations, wherein a respective text content shows recommendation reason information corresponding to a respective commodity object combination.

After the plurality of commodity objects meeting the search intent of the users are determined, in the example of the present disclosure, these commodity objects are not directly returned to the client to be listed and displayed by the client in the form of information flow; rather, these commodity objects are supported with humanized text feedback, making the overall dialogue process more thorough without affecting the browsing efficiency of the users. Compared with the traditional templated output, using the text generation capability of the AI large-scale parametric model enables the overall text to be much more similar to the chatting between two people.

For example, in the example of the present disclosure, a plurality of commodity objects meeting the search conditions can first be analyzed to obtain a plurality of commodity object combinations; and text content can also be generated in units of the commodity object combinations. Such text content can be, for example, used for showing recommendation reason information corresponding to specific commodity object combinations. In a specific implementation, this step may be: using the text generation and abstraction capability of the AI large-scale parametric model to combine search results through different dimensions such as brand, category, function, applicable population, and applicable occasion; and generating corresponding recommendation reasons.

For example, assuming that a search condition input by a user is "It's my girlfriend's birthday next week and I want to buy her a gift." After performing understanding on the search intent of the user and obtaining a plurality of commodity objects that match the search intent, the commodity objects can be grouped into a plurality of commodity object combinations according to the categories, and the like, such as clothing, footwear, etc.; in addition, based on category dimension, the commodity objects may be further and continuously grouped into multiple different commodity object combinations according to brands, and corresponding text content related to the recommended reasons is respectively generated.

S206: providing, to a client, the commodity object combinations and the corresponding text contents to be displayed in a commodity search result page of the client.

After the above commodity object combinations and the corresponding text content are obtained, they can be returned to the client, so that the client may visually display the above information to the user in the commodity search result page. For example, as shown in FIG. 4(A), various commodity object combinations can be displayed in groups on a specific search result page, and each group corresponds to text content of the respective reasons for recommendation. Here, the first group can be clothing of a certain brand, and the specific recommendation reason may be: "This is a Canadian brand that specializes in providing fashionable and high-quality clothing for women, known for its minimalism." The second group can be shoes of a certain brand, and the recommendation reason may be: "A shoe brand that focuses on eco-friendly comfort, mainly made of natural materials such as wool and plants, etc.", and the like. In this way, although the amount of text in the commodity search result page is increased compared to tags in the traditional mode, the text provides more thorough information and can be generated differentially for different scenarios and the like, which is more understandable, reduces the comprehension burden of users in understanding commodity information, and helps the users to find a commodity they wish to purchase more efficiently and precisely.

In addition, in addition to optimizing the organization and display modes of commodity search results by means of the above manners, a multi-round dialogue capability of the AI large-scale parametric model may further be used in the process of users browsing the search results. Through the dialogue, users' search intent will be better understood and more detailed or precise information is obtained, thus more precise search results may be gradually provided. For example, the AI large-scale parametric model may be used to perform model understanding on user behavior information generated by the user while browsing the search results page and/or related commodity object information, and question text content for questions to be raised to the user may be generated. Then, the question text content may be provided to the client, so that the client displays the question text content on the commodity search result page. After response content that the user submits based on the question text content is received, model understanding on question-and-response content and the previously input initial search condition information may be performed through the AI large-scale parametric model, and the search intent information of the user is updated, such that a new commodity object search result according to the updated search intent information may be provided. That is to say, after the above question-and-response content is generated, a comprehensive determination can be made together with the initial search condition information previously input by the user when initiating the search request, thereby obtaining a more precise search intent of the user.

For example, assuming that a user continuously swipes through multiple times in the process of browsing the search result page without making a click action, a specific question text content can then be generated and displayed through the search result page. For example, as shown at 404 in FIG. 4(B), the question text content can be inserted into the search result page, for example, displayed as: "What style does your girlfriend like?", and the like. Of course, in a specific implementation, the above question text content may also be displayed through a pop-up window, and the like. After the question text content is displayed, the user can respond, and there might be various specific response methods. For example, a control for inputting the response content may be provided while the above question text content is displayed; or, a search input control is kept at the top of the current search result page, enabling the user to return to that position to input the response content. Alternatively, in another manner, in order to facilitate the responding by the user, a plurality of alternative response text content can also be generated and provided to the client for display when the question text content for questions to be raised to the user is generated through the AI large model, so that the user respond by selecting from the plurality of alternative response text content. For example, in the example shown at 404 in FIG. 4(B), when the question "What style does your girlfriend like?" is raised, tags for various options such as "comfortable", "cute", and "outdoor" may also be provided, and users may make a selection therefrom. If none of these is the response the users would like to make, specific style information can then be input by the users. After the response content from the user is received, the search intent of the user can be comprehensively determined based on the specific question-and-response content and the initial search condition information previously input by the user. For example, in the above example, assuming that the response selected by the user is "outdoor", it can be comprehensively determined that the commodity the user is looking for is: a commodity having an outdoor style and suitable as a gift for a girlfriend at the birthday occasion, and the like.

In a specific implementation, the process of generating dialogue text content and receiving the response content that the user submits has multiple rounds, so that the AI large-scale parametric model may gradually acquire and update the search intent information of the user by performing model understanding on the dialogue content accumulated in the multiple rounds of question-and-response process and the initial search condition information. In other words, after one round of question-and-response process is complete, the search result page can be refreshed and displayed. After that, new question text content can be generated based on further browsing behavior data of the user, and can be responded by the user. After the user makes a response, the search intent of the user can be updated again, and the content displayed in the search result page can be refreshed again, and so on. In this way, predicted results on the search intent of the user can be gradually updated or modified through the multiple rounds of question-and-response processes, thereby providing more precise commodity search results. In this way, the AI large-scale parametric model may always shop along the users during the search process, providing the users with the "whole-process shopping along" search experience, such that the users may feel as if they are in a physical store with a dedicated shopping assistant providing services in that they are not checking the commodities on the shelves by themselves, but having the shopping assistant introducing or recommending commodities for them. At the same time, such guide shopping service may only appear at the appropriate timing, rather than constantly requiring having a dialogue with the users, thereby reducing the interference with the specific search process of the users.

It should be noted herein that in the example of the present disclosure, during the specific search process, users may have multiple rounds of dialogue with the AI. Therefore, the dialogue content may also be displayed on the commodity search result page, i.e., providing a dialogue content display area on the commodity search result page, such that users are made aware that the currently displayed search results are generated based on specific dialogue content. Of course, considering factors like how effective the displayed page information is, the latest round of dialogue content may be displayed by default on the commodity search result page. For example, as shown at 402 in FIG. 4(A), the latest round of dialogue content is displayed at the top of the search result page. There are certainly some other ways for users to track historical dialogue content during their current search process. For example, if a drop-down operation is performed in the dialogue content display area shown at 402 in FIG. 4(A), the size of the dialogue content display area may be expanded, and more dialogue content may be displayed, as shown at 406 in FIG. 4(C).

In conclusion, in the examples of the present disclosure, after a commodity object search request submitted by a user is received and a plurality of commodity objects meeting a search intent are determined, a plurality of commodity object combinations can be obtained by analyzing the plurality of commodity objects, and text content in units of the commodity object combinations can be generated, so that the recommendation reason information corresponding to the specific commodity object combinations can be shown through the text content. In this way, the client can display the above commodity object combinations and the corresponding text content on the search result page. In this way, when the commodity object search results are displayed, various commodity objects can be displayed in groups instead of simply being individually listed, where each group may further correspond to the text content of the respective reasons for recommendation. In this way, the amount of text displayed on the commodity search result page is increased compared to the traditional method. However, since more thorough content is shown, the presence of such content allows the information displayed on the commodity search result page to guide shopping. Personalized text content may also be generated for different scenarios. Thus, the comprehension burden of users understanding commodity information can be reduced. Users may determine whether to click and view a specific commodity by referring to shopping-guided text content, thus more user friendly and more conducive to improving indexes such as the click-through rate of the commodities.

For example, in the process of displaying the search result page, capabilities such as natural language understanding and generating of the AI large-scale parametric model can be fully leveraged to perform further model understanding on user behavior data and/or related commodity information, so as to generate text content for questions further to be raised to the users. In this way, users can be guided to respond to the text content. Accordingly, the AI large-scale parametric model can acquire more detailed information about the search intent of the users by performing model understanding on question-and-response content and the previous initial search condition information, and provide a new commodity object search result based on the updated user needs information.

In addition, the AI large-scale parametric model also has the capability to perform multiple rounds of dialogue, and as such, this dialogue process may also be carried out multiple times. In other words, after the commodity search result is updated, the process may continue with more questions raised according to the user behavior data, so that the AI large-scale parametric model may gradually acquire more detailed and precise information about the search intent of the users in the process of carrying out multiple rounds of dialogue therewith, and thus providing search results better matching users' needs. In this way, the whole process of "shop-along" search can be carried out for the users using the AI large-scale parametric model, so as to help the users to find commodities they really desire. In addition, although such "shop-along" search can be carried out through the whole process, the function does not have to be there the whole time, nor are users always asked to take part in the dialogue. Instead, according to the real-time behavior data users generate on the search result page, an appropriate dialogue timing is chosen for carrying out the dialogue with the users. In this way, interference to users who are accustomed to the traditional search method can also be reduced, and at the same time, the quality of the search results is improved.

The present disclosure also provides a method for providing commodity object search information from the perspective of a client. Referring to FIG. 5, the method may comprise:

S502: receiving a commodity object search request initiated by a user inputting initial search condition information on a target page;

S504: submitting the search request to a server to acquire commodity object search results; and S506: generating, according to the search results returned by the server, a search result page, and displaying the search results, wherein the search results comprise a plurality of commodity object combinations and the generated corresponding text contents, wherein a respective text content is used for showing recommendation reason information corresponding to the respective commodity object combination.

For example, the initial search condition information comprises a long statement expressed in natural language; at this time, prompt text content for guiding a search initiated by means of inputting the long statement expressed in natural language is provided on the target page, so that the server acquires search intent information of the users by using an AI large-scale parametric model to performing model understanding on the long statement expressed in natural language; and a plurality of commodity objects meeting a search intent are determined based on the search intent information.

In addition, the question text content provided by the server may also be displayed on the search result page, wherein the question text content comprises: text content used for questions to be raised to the users and generated after AI large-scale parametric model is performed on user behavior information generated by the users when browsing the search result page and/or related commodity object information. After response content with respect to the question text content is received from the users, the response content is submitted to the server, so that the server performs model understanding on question-and-response content and the initial search condition information using the AI large-scale parametric model, and provides a new commodity object search result after updating search intent information of the users. Then, the commodity search result page may be refreshed and displayed according to the new commodity object search result returned by the server.

For example, the process of generating dialogue text content and receiving response content that the user submits may be in multiple rounds, so that model understanding is performed on the dialogue content accumulated in the multiple rounds of question-and-response process and the initial search condition information, and the search intent information of the user is gradually acquired and updated.

A dialogue content display area may further be provided on the search result page, wherein the dialogue content display area, by default, is configured to display the latest round of dialogue content; and after a request for backtracking historical dialogue content is received, the historical dialogue content is displayed in the dialogue content display area.

In the aforementioned examples, on the basis of grouping search results and providing recommendation reason content, more precise search intent information of the users may be gradually acquired through multiple rounds of dialogue, so as to provide more precise search results. However, in the example of the present disclosure, even if the search results are not displayed in groups and recommendation reasons are not provided, more accurate information about the search intent of the user may still be acquired through dialogue during the search process, so as to provide more precise search results. Therefore, the present disclosure further provides another method for providing commodity object search information from the perspective of a server. Referring to FIG. 6, the method may comprise:

S602: determining, according to initial search condition information included in a commodity object search request submitted by a user, a search intent of the user, and determining a plurality of commodity objects meeting the search intent;

S604: performing model understanding on user behavior information generated by the user while browsing a search results page and/or related commodity object information, and generating question text content for questions to be raised to the user;

S606: providing the question text content to a client, so that the client displays the question text content on the commodity search result page; and S608: after receiving response content that the user submits based on the question text content, performing model understanding on question-and-response content and the initial search condition information, updating the search intent information of the user, and providing a new commodity object search result according to the updated search intent information.

The present disclosure also provides a method for providing commodity object search information from the perspective of a client. Referring to FIG. 7, the method may comprise:

S702: after receiving a commodity object search request initiated by a user inputting initial search condition information, displaying commodity object search results on a search result page;

S704: receiving question text content provided by a server, and displaying the question text content using the search result page, wherein the question text content is text content used for questions to be raised to the user and generated after model understanding is performed on user behavior information generated by the user when browsing the search result page and/or related commodity object information;

S706: after receiving response content of the user with respect to the question text content, submitting the response content to the server, so that the server performs model understanding on question-and-response content and the initial search condition information, and providing a new commodity object search result after updating search intent information of the user; and S708: refreshing and displaying the commodity search result page according to the new commodity object search result returned by the server. As mentioned above, the specific question text content may be generated by calling an AI large-scale parametric model, and the question-and-response content is question-andresponse content generated during a single round or multiple rounds of question-and-response dialogue interaction between the AI large-scale parametric model and the user. That is to say, the search results may be continuously updated according to the single round or multiple rounds of dialogue interaction between the AI large-scale parametric model and the user.

For example, during the dialogue interaction between user and the AI large-scale parametric model, the user may input response content through a search input control of the search result page (the specific search input control may be a search input box at the top of the page, and the like, and may be the content input through a keyboard or speech, etc.). Alternatively, a dialogue interaction entry component may further be displayed on hover of the search result page, so that the user may complete the input of the response content without having to return to the top of the page.

For the parts not described in detail, reference may be made to each example and the other parts of this specification, which will not be described herein again.

It should be noted that the examples of the present disclosure may involve the use of user data. In practical applications, user-specific personal data may be used in the solutions described herein within the scope of the applicable laws and regulations (e.g., explicit consent from the users, effective notification to the user, etc.) in compliance with the applicable laws and regulations in the country where the solutions are implemented.

Figure 8:
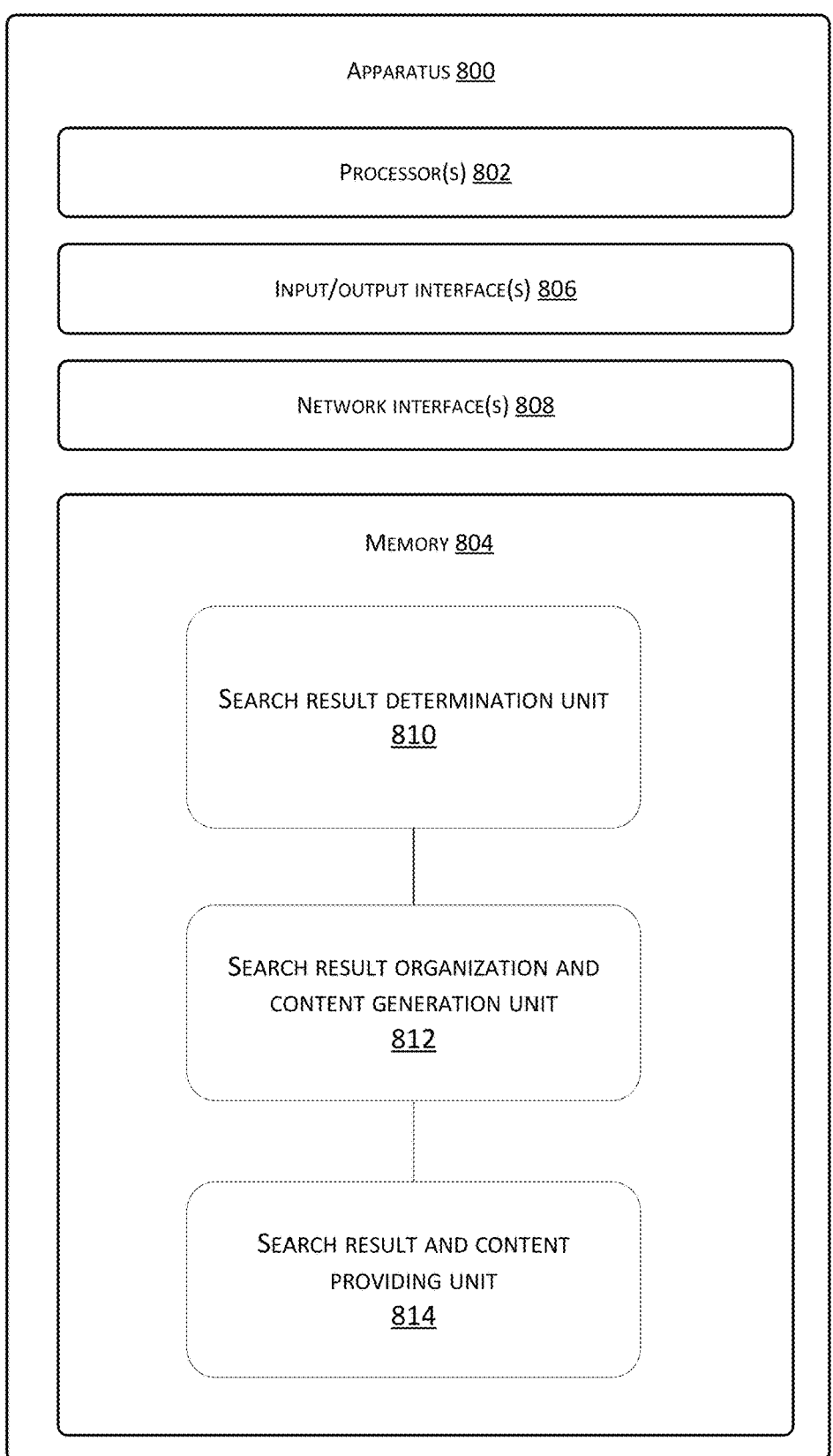
FIG. 8 is a schematic diagram of a first apparatus provided by an example of the present disclosure.

Corresponding to Example 1, the example of the present disclosure further provides an apparatus for providing commodity object search information. Referring to FIG. 8, the apparatus 800 includes one or more processor(s) 802 or data processing unit(s) and memory 804. The apparatus 800 may further include one or more input/output interface(s) 806 and one or more network interface(s) 808. The memory 804 is an example of computer-readable media.

Computer-readable media further include non-volatile and volatile, removable and non-removable media employing any method or technique to achieve information storage. The information may be computer-readable instructions, data structures, modules of programs, or other data. Examples of computer storage media include, but are not limited to, a phase-change random access memory (PRAM), a static random access memory (SRAM), a dynamic random access memory (DRAM), other types of random access memories (RAM), a read-only memory (ROM), an electrically erasable programmable read-only memory (EE-PROM), a flash memory or other memory technologies, a compact disc read-only memory (CD-ROM), a digital versatile disc (DVD) or other optical memories, a magnetic cassette tape, a magnetic tape, a magnetic disk storage or other magnetic storage devices, or any other non-transmission medium, which may be used to store information that can be accessed by a computing device. As defined herein, the computer-readable media do not include transitory media, such as modulated data signals and carriers.

The memory 804 may store therein a plurality of modules or units including:

a search result determination unit 801, configured to determine, according to a commodity object search request submitted by a user, a plurality of commodity objects meeting a search intent;

a search result organization and content generation unit 812, configured to analyze the plurality of commodity objects to obtain a plurality of commodity object combinations, and generate text content in units of the commodity object combinations, wherein the text content shows recommendation reason information corresponding to the commodity object combinations; and a search result and content providing unit 814, configured to provide, to a client, the commodity object combinations and the corresponding text content to be displayed in a commodity search result page of the client.

The commodity object search request comprises initial search condition information input by the user, and the initial search condition information comprises a long statement expressed in natural language;

the search result determination unit may be configured to:
perform model understanding on the long statement expressed in natural language by using artificial intelligence (AI) large-scale parametric model, so as to acquire search intent information of the user; and determine the plurality of commodity objects meeting the search intent based on the search intent information.

For example, the apparatus may further comprise:
a prompt text content generation unit, configured to, before receiving the commodity object search request, generate prompt text content for guiding a search initiated by means of inputting the long statement expressed in natural language; and
a prompt text content providing unit, configured to provide the prompt text content to the client, so that the client displays the prompt text content in an interface used for receiving a search input condition.

In addition, the apparatus may further comprise:
a topic question providing unit, configured to provide, to the client, a recommended topic text, so as to allow the client to display the recommended topic text in the form of tags; and after receiving a selection operation on the tag performed by the use, initiate a search request by using the corresponding topic text as a search condition.

Furthermore, the apparatus may further comprise:
a question text content generation unit, configured to use the AI large-scale parametric model to perform model understanding on user behavior information generated by the user while browsing the search results page and/or related commodity object information, and generate question text content for questions to be raised to the user;
a question text content providing unit, configured to provide the question text content to the client, so that the client displays the question text content on the commodity search result page; and
a search result update unit, configured to, after receiving response content that the user submits based on the question text content, perform model understanding on question-and-response content and the initial search condition information through the AI large-scale parametric model, update the search intent information of the user, and provide a new commodity object search result according to the updated search intent information.

Furthermore, the apparatus may further comprise:
a response text content providing unit, configured to further generate a plurality of alternative response text content when generating the question text content for questions to be raised to the users, and provide the alternative response text content to the client, so as to allow the users to respond by making a selection from the plurality of alternative response text content.

Herein, the process of generating dialogue text content and receiving response content that the user submits has multiple rounds, so that the AI large-scale parametric model gradually acquires and updates the search intent information of the users by performing model understanding on the dialogue content accumulated in the multiple rounds of question-and-response process and the initial search condition information.

Figure 9:
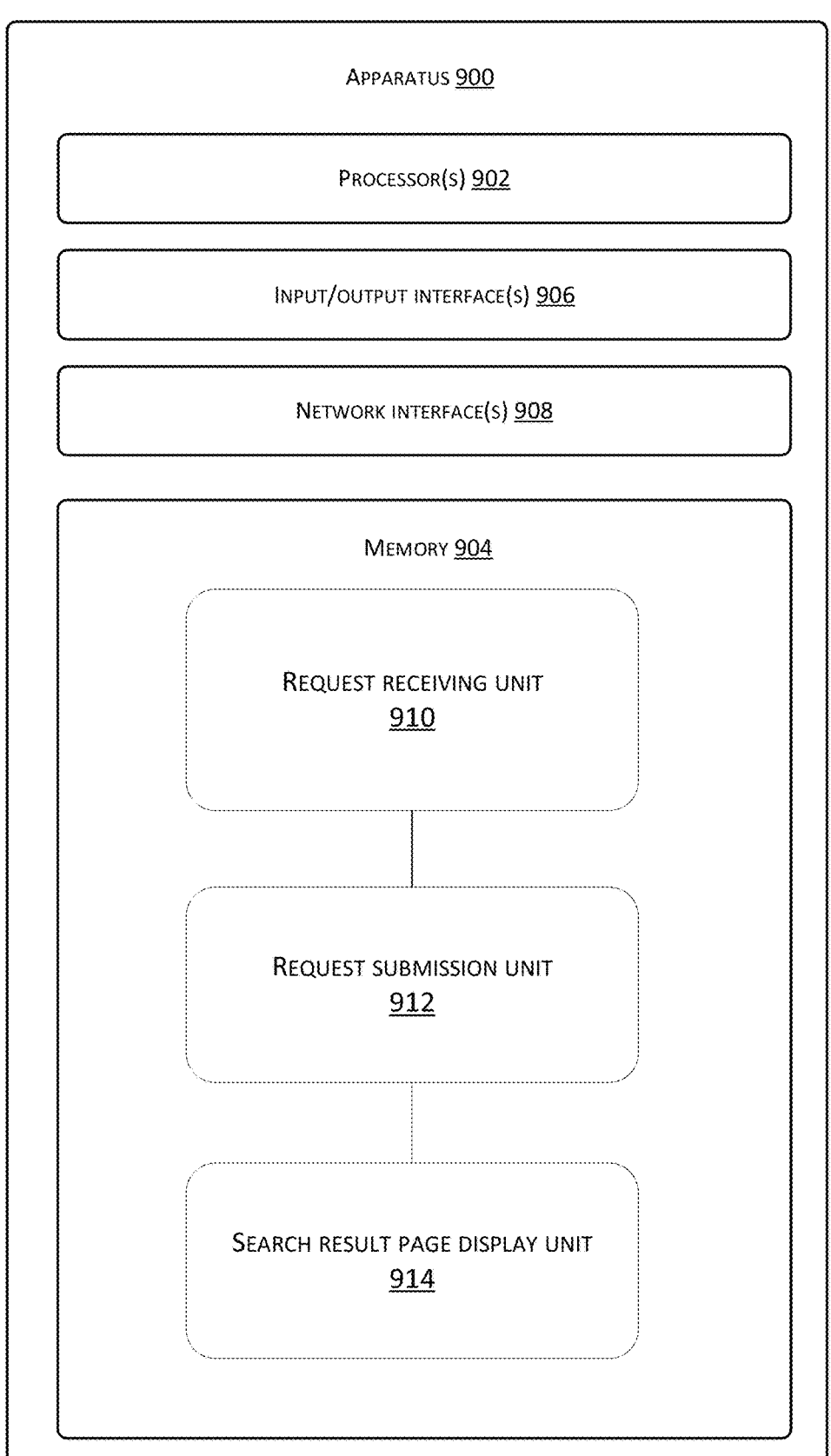
FIG. 9 is a schematic diagram of a second apparatus provided by an example of the present disclosure.

Corresponding to the method for providing commodity object search information from the perspective of a client, the example of the present disclosure further provides an apparatus for providing commodity object search information. Referring to FIG. 9, the apparatus 900 includes one or more processor(s) 902 or data processing unit(s) and memory 904. The apparatus 900 may further include one or more input/output interface(s) 906 and one or more network interface(s) 908. The memory 904 is an example of computer-readable media.

The memory 904 may store therein a plurality of modules or units including:

a request receiving unit 910, configured to receive a commodity object search request initiated by a user inputting initial search condition information on a target page;

a request submission unit 912, configured to submit the search request to a server to acquire commodity object search results; and a search result page display unit 914, configured to generate, according to the search results returned by the server, a search result page, and display the same, wherein the search results comprise a plurality of commodity object combinations and the generated text content, wherein the text content is used for showing recommendation reason information corresponding to the commodity object combinations.

The initial search condition information comprises a long statement expressed in natural language;

and at this time, the apparatus may further comprise:

a prompt text content display unit, configured to provide prompt text content for guiding a search initiated by means of inputting the long statement expressed in natural language on the target page, so that the server acquires search intent information of the user by using an AI large-scale parametric model to perform model understanding on the long statement expressed in natural language; and determine a plurality of commodity objects meeting a search intent based on the search intent information.

In addition, the apparatus may further comprise:

a question text content display unit, configured to receive question text content provided by the server, and display the question text content using the search result page, wherein the question text content comprises: text content used for questions to be raised to the user and generated after an AI large-scale parametric model performs model understanding on user behavior information generated by the user when browsing the search result page and/or related commodity object information;

a response content submission unit, configured to, after response content from the user with respect to the question text content is received, submit the response content to the server, so that the server performs model understanding on question-and-response content and the initial search condition information using the AI large-scale parametric model, and provides a new commodity object search result after updating search intent information of the user; and a refresh and display unit, configured to refresh and display the commodity search result page according to the new commodity object search result returned by the server.

Herein, the process of generating dialogue text content and receiving response content that the user submits has multiple rounds, so that model understanding is performed on the dialogue content accumulated in the multiple rounds of question-and-response process and the initial search condition information, and the search intent information of the user is gradually acquired and updated.

For example, the apparatus may further comprise:

a dialogue content display unit, configured to provide a dialogue content display area in the search result page, wherein the dialogue content display area, by default, is configured to display the latest round of dialogue content; and after a request for backtracking historical dialogue content is received, display the historical dialogue content in the dialogue content display area.

Figure 10:
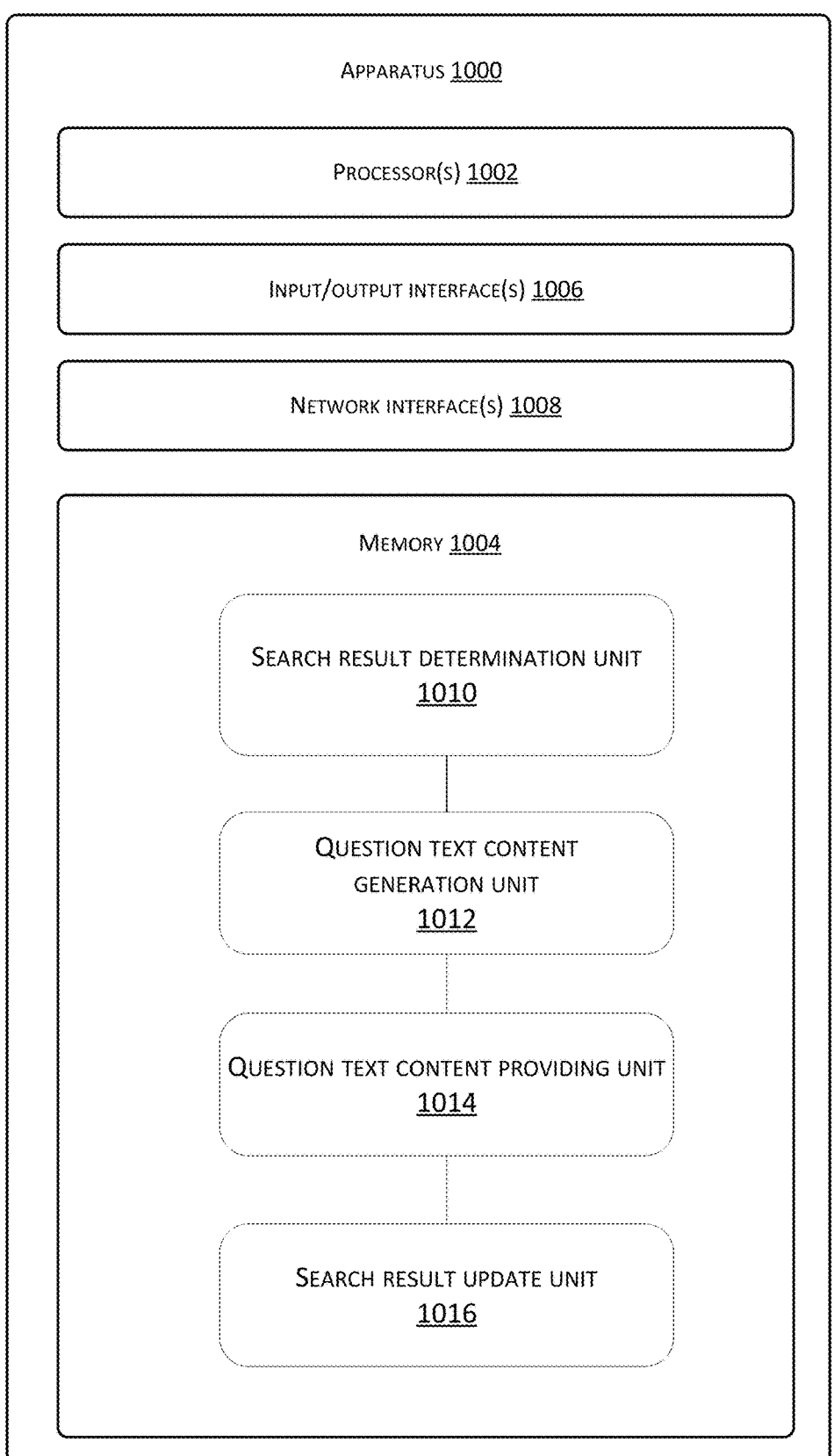
FIG. 10 is a schematic diagram of a third apparatus provided by an example of the present disclosure.

Corresponding to the method for providing commodity object search information from the perspective of a server, the example of the present disclosure further provides an apparatus for providing commodity object search information. Referring to FIG. 10, the apparatus 1000 includes one or more processor(s) 1002 or data processing unit(s) and memory 1004. The apparatus 1000 may further include one or more input/output interface(s) 1006 and one or more network interface(s) 1008. The memory 1004 is an example of computer-readable media.

The memory 1004 may store therein a plurality of modules or units including:

a search result determination unit 1010, configured to determine, according to initial search condition information included in a commodity object search request submitted by a user, a search intent of the user, and determine a plurality of commodity objects meeting the search intent;

a question text content generation unit 1012, configured to perform model understanding on user behavior information generated by the user while browsing a search results page and/or related commodity object information, and generate question text content for questions to be raised to the user;

a question text content providing unit 1014, configured to provide the question text content to the client, so that the client displays the question text content on the commodity search result page; and a search result update unit 1016, configured to: after response content that the user submits based on the question text content is received, perform model understanding on question-and-response content and the initial search condition information, update the search intent information of the user, and provide a new commodity object search result according to the updated search intent information.

Figure 11:
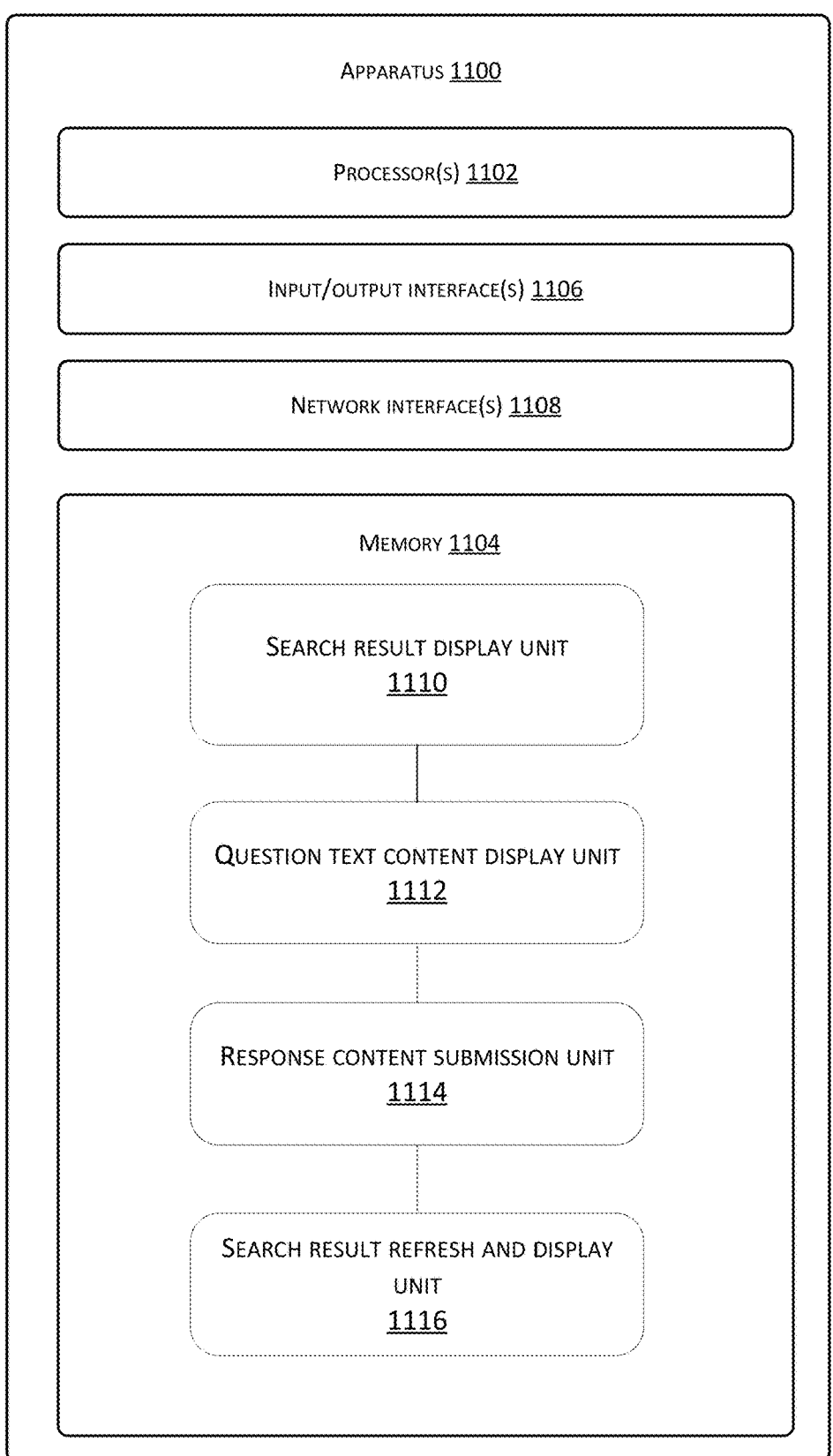
FIG. 11 is a schematic diagram of a fourth apparatus provided by an example of the present disclosure.

Corresponding to the method for providing commodity object search information from the perspective of a client, the example of the present disclosure further provides an apparatus for providing commodity object search information. Referring to FIG. 11, the apparatus 1100 includes one or more processor(s) 1102 or data processing unit(s) and memory 1104. The apparatus 1100 may further include one or more input/output interface(s) 1106 and one or more network interface(s) 1108. The memory 1104 is an example of computer-readable media.

The memory 1104 may store therein a plurality of modules or units including:

a search result display unit 1110, configured to: after a commodity object search request initiated by a user inputting initial search condition information is received, display commodity object search results on a search result page;

a question text content display unit 1112, configured to receive question text content provided by a server, and display the question text content using the search result page, wherein the question text content is text content used for questions to be raised to the user and generated after model understanding is performed on user behavior information generated by the user when browsing the search result page and/or related commodity object information;

a response content submission unit 1114, configured to: after response content of the user with respect to the question text content is received, submit the response content to the server, so that the server performs model understanding on question-and-response content and the initial search condition information, and provides a new commodity object search result after updating search intent information of the user; and a search result refresh and display unit 1116, configured to refresh and display the commodity search result page according to the new commodity object search result returned by the server.

Herein, the question text content is generated by calling an AI large-scale parametric model, and the question-and-response content is question-and-response content generated during a single round or multiple rounds of question-and-response dialogue interaction between the AI large-scale parametric model and the user.

For example, the response content submission unit may be configured to: receive the response content through a search input control on the search result page, and submit the response content to the server. Alternatively, the response content is received through a dialogue interaction entry component displayed on hover of the search result page, and is submitted to the server.

In addition, the example of the present disclosure further provides a computer-readable storage medium having a computer program stored thereon which, when executed by a processor, implements the steps of the methods described in any of the above-described method examples.

Also provided is an electronic device, comprising:

one or more processors; and a memory associated with the one or more processors, the memory being configured to store program instructions which, when read and executed by the one or more processors, execute the steps of the methods described in any of the above-described method examples.

Figure 12:
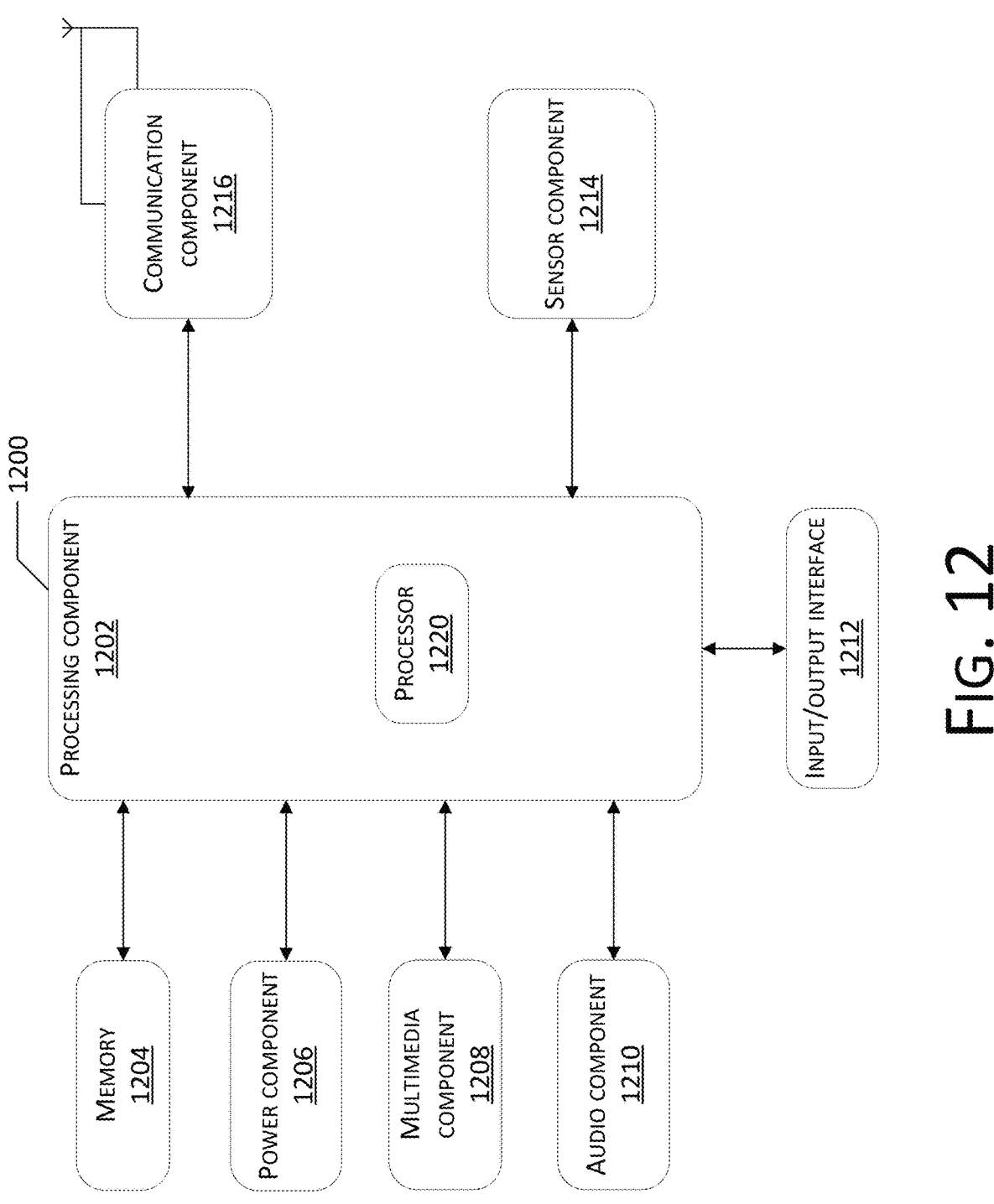
FIG. 12 is a schematic diagram of an electronic device provided by an example of the present disclosure.

FIG. 12 exemplarily shows the architecture of an electronic device, for example, the device 1200 may be a mobile phone, a computer, a digital broadcasting terminal, a messaging device, a game console, a tablet device, a medical device, a fitness device, a personal digital assistant, an aircraft, and the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 generally controls the overall operation of the device 1200, such as operations associated with display, phone calls, data communications, camera operations, and recording operations. The processing component 1202 may include one or more processors 1220 to execute instructions to implement all or part of the steps of the methods provided by the technical solutions of the present disclosure. Additionally, the processing component 1202 may include one or more modules to facilitate the interaction between the processing component 1202 and other components. For example, the processing component 1202 may include a multimedia module to facilitate the interaction between the multimedia component 1208 and the processing component 1202.

The memory 1204 is configured to store various types of data to support operations on the device 1200. Examples of such data include instructions, contact data, phonebook data, messages, pictures, videos and the like used for any application programs or methods operating on the device 1200. The memory 1204 may be implemented by any type of volatile or non-volatile memory device or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power component 1206 provides power to the various components of the device 1200. The power components 1206 may include a power management system, one or more power supplies, and other components associated with generating, managing, and distributing power for the device 1200.

The multimedia component 1208 includes a screen that provides an output interface between the device 1200 and users. In some examples, the screen may include a liquid crystal display (LCD) and a touch panel (TP). If the screen includes a touch panel, the screen may be implemented as a touch screen to receive input signals from a user. The touch panel includes one or more touch sensors to sense touch, swiping, and gestures on the touch panel. The touch sensor may not only sense the boundary of a touch or slide action, but also detect the duration and pressure related to the touch or sliding operation. In some examples, the multimedia component 1208 includes a front-facing camera and/or a rear-facing camera. When the device 1200 is in an operation mode, such as a photo-taking mode or a video mode, the front-facing camera and/or the rear-facing camera may receive external multimedia data. Each of the front-facing camera and/or the rear-facing camera can be a fixed optical lens system or have focal length and optical zoom capability.

The audio component 1210 is configured to output and/or input audio signals. For example, the audio component 1210 includes a microphone (MIC) configured to receive an external audio signal when the device 1200 is in an operating mode, for example, in a call mode, recording mode, or voice recognition mode. The received audio signal may be further stored in the memory 1204 or sent through the communication component 1216. In some examples, the audio component 1210 further includes a speaker for outputting an audio signal.

The I/O interface 1212 provides an interface between the processing component 1202 and a peripheral interface module that may be a keyboard, a click wheel, buttons, or the like. These buttons may include, but are not limited to: a home button, volume buttons, a start button, and a lock button.

The sensor component 1214 includes one or more sensors for providing status assessment of various aspects of the device 1200. For example, the sensor component 1214 can detect the open/closed state of the device 1200, and the relative positioning of components such as the display and keypad of the device 1200. The sensor component 1214 can further detect a change in the position of the device 1200 or a component of the device 1200, the presence or absence of user contact with the device 1200, orientation or acceleration/deceleration of the device 1200, and temperature changes of the device 1200. The sensor component 1214 may include a proximity sensor configured to detect the presence of nearby objects in the absence of any physical contact. The sensor component 1214 may also include a light sensor such as a CMOS or CCD image sensor for use in imaging applications. In some examples, the sensor component 1214 may also include an acceleration sensor, a gyroscope sensor, a magnetic sensor, a pressure sensor, or a temperature sensor.

The communication component 1216 is configured to facilitate wired or wireless communications between the device 1200 and other devices. The device 1200 can access a wireless network based on communication standards, such as mobile communication networks like WiFi, or 2G, 3G, 4G/LTE, and 5G. In an example, the communication component 1216 receives, through a broadcast channel, broadcast signals or broadcast-related information from an external broadcast management system. In an example, the communication component 1216 further comprises a near field communication (NFC) module to facilitate short range communications. For example, the NFC module can be implemented based on the radio frequency identifier (RFID) technology, the infrared data association (IrDA) technology, the ultra-wideband (UWB) technology, the Bluetooth (BT) technology, and other technologies.

In an example, the device 1200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above methods.

In an example, a non-transitory computer-readable storage medium having instructions is also provided, such as the memory 1204 having instructions, and the above-mentioned instructions can be executed by the processor 1220 of the device 1200 to complete the method provided by the technical solution of the present disclosure. For example, the non-transitory computer-readable storage medium may be ROM, random access memory (RAM), CD-ROM, a magnetic tape, a floppy disk, an optical data storage device, and the like.

It can be seen from the description of the above examples that those skilled in the art can clearly understand that the present disclosure can be implemented by means of software and the necessary general hardware platform. Based on such an understanding, the part of the technical solution of the present disclosure, which is essential or contributes to the conventional techniques, can be embodied in the form of a software product. The computer software product can be stored in a storage medium, such as a ROM/RAM, a magnetic disk, and an optical disk, and include several instructions for enabling a computer device (which may be a personal computer, a server, a network device, or the like) to execute the methods described in the examples or some parts of the examples of the present disclosure.

The various examples in this specification are all described in a progressive manner. The various examples may refer to other examples for the same or similar parts, and each of the examples focuses on the parts differing from the other examples. In particular, the system or system examples are basically similar to the method examples, the description for these examples is thus relatively brief, and the description of the method examples may be referred to for relevant details. The system and system examples described above are only examples, wherein the units described as separate components may or may not be physically separated; and the components displayed as units may or may not be physical units; that is, the units may be located in one place, or may be distributed on a plurality of network units. Some or all of the modules may be selected according to actual needs to achieve the objectives of the solutions of the examples. Those of ordinary skill in the art may understand and implement the examples without creative efforts.

The method for providing commodity object search information and the electronic device provided by the present disclosure have been introduced in detail above. The principles and implementations of the present disclosure are described with specific examples herein. The descriptions of the above examples are only used to help understand the methods and the core idea of the present disclosure. At the same time, for those skilled in the art, according to the idea of the present disclosure, there will be modifications in specific implementations and the application scope. In conclusion, the content of the present specification should not be construed as a limitation to the present disclosure.

The present disclosure may further be understood with clauses as follows.

Clause 1. A method for providing commodity object search information, the method comprising:

determining, according to a commodity object search request submitted by a user, a plurality of commodity objects meeting a search intent;

analyzing the plurality of commodity objects to obtain a plurality of commodity object combinations, and generating text contents in units of the commodity object combinations, a respective text content showing recommendation reason information corresponding to a respective commodity object combination; and providing, to a client, the commodity object combinations and the corresponding text contents to be displayed in a commodity search result page of the client.

Clause 2. The method according to clause 1, wherein:

the commodity object search request comprises initial search condition information input by the user, and the initial search condition information comprises a long statement expressed in a natural language;

the determining, according to the commodity object search request submitted by the user, the plurality of commodity objects meeting the search intent comprises:

performing model understanding on the long statement expressed in the natural language by using an artificial intelligence (AI) large-scale parametric model, so as to acquire search intent information of the user; and determining the plurality of commodity objects meeting the search intent based on the search intent information.

Clause 3. The method according to clause 2, further comprising:

before receiving the commodity object search request, generating a prompt text content for guiding a search initiated by inputting the long statement expressed in the natural language; and providing the prompt text content to the client, so that the client displays the prompt text content in an interface used for receiving a search input condition.

Clause 4. The method according to clause 2, further comprising:

using the AI large-scale parametric model to perform model understanding on user behavior information generated by the user while browsing the search results page and/or related commodity object information, and generating a question text content for questions to be raised to the user;

providing the question text content to the client, so that the client displays the question text content on the commodity search result page; and after receiving a response content that the user submits based on the question text content, performing model understanding on a question-and-response content and the initial search condition information through the AI large-scale parametric model, updating the search intent information of the user, and providing a new commodity object search result according to updated search intent information.

Clause 5. The method according to clause 4, wherein:

a process of generating a dialogue text content and receiving the response content that the user submits has multiple rounds, so that the AI large-scale parametric model gradually acquires and updates the search intent information of the user by performing model understanding on a dialogue content accumulated in the multiple rounds of question-and-response processes and the initial search condition information.

Clause 6. A method for providing commodity object search information, the method comprising:

receiving a commodity object search request initiated by a user inputting initial search condition information on a target page;

submitting the commodity object search request to a server to acquire commodity object search results; and generating, according to the commodity object search results returned by the server, a search result page, and displaying the commodity object search results, the commodity object search results including a plurality of commodity object combinations and generated text contents, a respective text content showing recommendation reason information corresponding to a respective commodity object combination.

Clause 7. The method according to clause 6, further comprising:

receiving a question text content provided by the server, and displaying the question text content on the search result page, wherein the question text content comprises: text content used for questions to be raised to the user and generated after an artificial intelligence (AI) large-scale parametric model performs model understanding on user behavior information generated by the user when browsing the search result page and/or related commodity object information;

after receiving a response content from the user with respect to the question text content, submitting the response content to the server, so that the server performs model understanding on a question-and-response content and the initial search condition information using the AI large-scale parametric model and provides a new commodity object search result after updating search intent information of the user; and according to a new commodity object search result returned by the server, refreshing and displaying the commodity search result page.

Clause 8. The method according to clause 7, wherein:

a process of generating dialogue text content and receiving response content that the user submits has multiple rounds, so that model understanding is performed on a dialogue content accumulated in the multiple rounds of question-and-response processes and the initial search condition information, and the search intent information of the user is gradually acquired and updated.

Clause 9. The method according to clause 8, further comprising:

providing a dialogue content display area in the search result page, wherein the dialogue content display area, by default, is configured to display a latest round of dialogue content; and after receiving a request for backtracking a historical dialogue content, displaying the historical dialogue content in the dialogue content display area.

Clause 10. A method for providing commodity object search information, the method comprising:

determining, according to initial search condition information included in a commodity object search request submitted by a user, a search intent of the user, and determining a plurality of commodity objects meeting the search intent;

performing model understanding on user behavior information generated by the user while browsing a search results page and/or related commodity object information, and generating a question text content for questions to be raised to the user;

providing the question text content to a client, so that the client displays the question text content on a commodity search result page; and after receiving a response content that the user submits based on the question text content, performing model understanding on a question-and-response content and the initial search condition information, updating search intent information of the user, and providing a new commodity object search result according to updated search intent information.

Clause 11. A method for providing commodity object search information, the method comprising:

after receiving a commodity object search request initiated by a user inputting initial search condition information, displaying commodity object search results on a search result page;

receiving a question text content provided by a server, and displaying the question text content using the search result page, the question text content being a text content used for questions to be raised to the user and generated after model understanding is performed on user behavior information generated by the user when browsing the search result page and/or related commodity object information;

after receiving a response content of the user with respect to the question text content, submitting the response content to the server, so that the server performs model understanding on a question-and-response content and the initial search condition information, and providing a new commodity object search result after updating search intent information of the user; and according to a new commodity object search result returned by the server, refreshing and displaying the search result page.

Clause 12. The method according to clause 11, wherein:

the question text content is generated by calling an artificial intelligence (AI) large-scale parametric model, and the question-and-response content is generated during a single round or multiple rounds of question-and-response dialogue interaction between the AI large-scale parametric model and the user.

Clause 13. A computer-readable storage medium having a computer program stored thereon which, when executed by a processor, executes the steps of the method according to any one of clauses 1 to 12.

Clause 14. An electronic device, comprising:

one or more processors; and a memory associated with the one or more processors, the memory being configured to store program instructions which, when read and executed by the one or more processors, execute the steps of the method according to any one of clauses 1 to 12.

What is claimed is:

1. A method for providing commodity object search information, the method comprising:

determining, according to a commodity object search request submitted by a user, a plurality of commodity objects meeting a search intent;

analyzing the plurality of commodity objects to obtain a plurality of commodity object combinations;

generating text contents corresponding to the plurality of commodity object combinations under a plurality of categories, a respective text content showing recommendation reason information corresponding to a respective commodity object combination, the recommendation reason information including a recommendation reason to display a respective commodity under a respective category; and providing, to a client, the plurality of commodity object combinations and the text contents under the plurality of categories to be displayed in a commodity search result page of the client.

2. The method according to claim 1, wherein:

the commodity object search request comprises initial search condition information input by the user; and the initial search condition information comprises a long statement expressed in a natural language.

3. The method according to claim 2, wherein the determining, according to the commodity object search request submitted by the user, the plurality of commodity objects meeting the search intent comprises:

performing model understanding on the long statement expressed in the natural language by using an artificial intelligence (AI) large-scale parametric model to acquire search intent information of the user; and determining the plurality of commodity objects meeting the search intent based on the search intent information.

4. The method according to claim 3, further comprising:

before receiving the commodity object search request, generating a prompt text content for guiding a search initiated by inputting the long statement expressed in the natural language.

5. The method according to claim 4, further comprising providing the prompt text content to the client to display the prompt text content in an interface used for receiving a search input condition.

6. The method according to claim 3, further comprising:

using an AI large-scale parametric model to perform model understanding on user behavior information generated by the user while browsing the commodity search result page or related commodity object information;

generating a question text content for questions to be raised to the user;

providing the question text content to the client to display the question text content on the commodity search result page;

after receiving a response content that the user submits based on the question text content, performing model understanding on a question-and-response content and the initial search condition information through the AI large-scale parametric model; and updating the search intent information of the user, and providing a new commodity object search result according to updated search intent information.

7. The method according to claim 6, wherein:

a process of generating a dialogue text content and receiving the response content from a user has multiple rounds, so that the AI large-scale parametric model gradually acquires and updates the search intent information of the user by performing model understanding on a dialogue content accumulated in the multiple rounds of question-and-response processes and the initial search condition information.

8. A method for providing commodity object search information, the method comprising:

receiving a commodity object search request initiated by a user inputting initial search condition information on a target page;

submitting the commodity object search request to a server to acquire commodity object search results;

generating, according to the commodity object search results returned by the server, a search result page; and displaying the commodity object search results, the commodity object search results including a plurality of commodity object combinations and generated text contents, a respective text content showing recommendation reason information corresponding to a respective commodity object combination.

9. The method according to claim 8, further comprising:

receiving a question text content provided by the server; and displaying the question text content on the search result page.

10. The method according to claim 9, wherein the question text content comprises: text content used for questions to be raised to the user and generated after an artificial intelligence (AI) large-scale parametric model performs model understanding on user behavior information generated by the user when browsing the search result page or related commodity object information.

11. The method according to claim 10, further comprising:

after receiving a response content from the user with respect to the question text content, submitting the response content to the server, so that the server performs model understanding on a question-and-response content and the initial search condition information using an AI large-scale parametric model and provides a new commodity object search result after updating search intent information of the user; and according to a new commodity object search result returned by the server, refreshing and displaying the search result page.

12. The method according to claim 11, wherein:

a process of generating dialogue text content and receiving response content from a user has multiple rounds, so that model understanding is performed on a dialogue content accumulated in the multiple rounds of question-and-response processes and the initial search condition information, and the search intent information of the user is gradually acquired and updated.

13. The method according to claim 12, further comprising:

providing a dialogue content display area in the search result page, wherein the dialogue content display area, by default, is configured to display a latest round of dialogue content; and after receiving a request for backtracking a historical dialogue content, displaying the historical dialogue content in the dialogue content display area.

14. An apparatus comprising:

one or more processors; and one or more memories storing thereon computer-readable instructions that, when executed by the one or more processors, cause the one or more processors to perform acts comprising:

determining, according to a commodity object search request submitted by a user, a plurality of commodity objects meeting a search intent;

analyzing the plurality of commodity objects to obtain a plurality of commodity object combinations;

generating text contents corresponding to the plurality of commodity object combinations, a respective text content showing recommendation reason information corresponding to a respective commodity object combination; and providing, to a client, the plurality of commodity object combinations and the text contents to be displayed in a commodity search result page of the client.

15. The apparatus according to claim 14, wherein:

the commodity object search request comprises initial search condition information input by the user; and the initial search condition information comprises a long statement expressed in a natural language.

16. The apparatus according to claim 15, wherein the determining, according to the commodity object search request submitted by the user, the plurality of commodity objects meeting the search intent comprises:

performing model understanding on the long statement expressed in the natural language by using an artificial intelligence (AI) large-scale parametric model to acquire search intent information of the user; and determining the plurality of commodity objects meeting the search intent based on the search intent information.

17. The apparatus according to claim 16, wherein the acts further comprise:

using an AI large-scale parametric model to perform model understanding on user behavior information generated by the user while browsing the search result page or related commodity object information;

generating a question text content for questions to be raised to the user;

providing the question text content to the client to display the question text content on the commodity search result page;

after receiving a response content that the user submits based on the question text content, performing model understanding on a question-and-response content and initial search condition information through the AI large-scale parametric model; and updating the search intent information of the user, and providing a new commodity object search result according to updated search intent information.

18. The apparatus according to claim 17, wherein:

a process of generating a dialogue text content and receiving the response content from a user has multiple rounds, so that the AI large-scale parametric model gradually acquires and updates the search intent information of the user by performing model understanding on a dialogue content accumulated in the multiple rounds of question-and-response processes and the initial search condition information.

19. The apparatus according to claim 15, wherein the acts further comprise:

before receiving the commodity object search request, generating a prompt text content for guiding a search initiated by inputting the long statement expressed in the natural language.

20. The apparatus according to claim 19, wherein the acts further comprise:

providing the prompt text content to the client to display the prompt text content in an interface used for receiving a search input condition.

* * * * *